United States Patent
Myhre et al.

(10) Patent No.: US 11,363,435 B2
(45) Date of Patent: Jun. 14, 2022

(54) NETWORK SLICING-AWARE ACCESS NETWORK

(71) Applicant: TELEFONAKTIEBOLAGET LM ERICSSON (PUBL), Stockholm (SE)

(72) Inventors: Elena Myhre, Järfälla (SE); Angelo Centonza, Stockholm (SE); Paul Schliwa-Bertling, Ljungsbro (SE); Peter Hedman, Helsingborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/341,362

(22) PCT Filed: Oct. 12, 2017

(86) PCT No.: PCT/IB2017/056296
§ 371 (c)(1),
(2) Date: Apr. 11, 2019

(87) PCT Pub. No.: WO2018/069852
PCT Pub. Date: Apr. 19, 2018

(65) Prior Publication Data
US 2020/0053531 A1  Feb. 13, 2020

Related U.S. Application Data

(60) Provisional application No. 62/406,442, filed on Oct. 11, 2016.

(51) Int. Cl.
*H04W 4/00* (2018.01)
*H04W 4/50* (2018.01)
(Continued)

(52) U.S. Cl.
CPC ............. *H04W 4/50* (2018.02); *H04W 60/04* (2013.01); *H04W 76/11* (2018.02)

(58) Field of Classification Search
CPC ... H04W 84/042; H04W 36/08; H04W 76/10; H04W 76/11; H04W 92/20; H04W 16/02;
(Continued)

(56) References Cited

U.S. PATENT DOCUMENTS 9,532,238 B2 * 12/2016  Lv .......................... H04W 24/02
2012/0282956 A1 * 11/2012  Kim ....................... H04L 51/38
455/466

(Continued)

OTHER PUBLICATIONS

Turk Telekom, "Network Slicing Solution with RAN Slicing", TSG SA Meeting #SP-73, Sep. 21-23, 2016, New Orleans, USA, SP-160534.
(Continued)

*Primary Examiner* — Joseph Arevalo

(57) ABSTRACT

According to some embodiments, a method for use in a core network node comprises: obtaining a mapping of core network (CN) slice identifiers to radio access network (RAN) slice identifiers; receiving a slice registration request from a user equipment (UE); determining a slice identifier associated with the slice registration request; and sending a slice registration response to the UE. The slice registration response includes the determined slice identifier. According to some embodiments, a method for use in a network node comprises obtaining a mapping of CN slice identifiers to RAN slice identifiers. The method may further comprise receiving a connection request from a UE that includes a network slice identifier; determining a RAN slice identifier based on the network slice identifier; and applying a policy of a network slice associated with the determined network slice identifier to the requested connection.

18 Claims, 28 Drawing Sheets

(51) Int. Cl.
*H04W 76/11* (2018.01)
*H04W 60/04* (2009.01)

(58) Field of Classification Search
CPC ............. H04W 24/10; H04W 28/0268; H04W 36/0011; H04W 36/0016; H04W 36/0061; H04W 36/0069; H04W 36/22; H04W 36/32; H04W 48/08; H04W 48/18; H04W 76/00; H04W 76/27; H04W 8/06; H04W 28/0215; H04W 28/16; H04W 36/0055; H04W 36/0077; H04W 36/0083; H04W 36/14; H04W 36/305; H04W 36/38; H04W 48/10; H04W 48/12
USPC ... 455/436, 452.1, 12.1, 450, 434, 522, 458, 455/432.1, 417, 411, 439, 552.1, 456.1, 455/550.1
See application file for complete search history.

(56) References Cited

U.S. PATENT DOCUMENTS

| | | | |
|---|---|---|---|
| 2015/0230090 A1* | 8/2015 | Barkan | H04M 3/42059 455/411 |
| 2015/0257051 A1* | 9/2015 | Rao | H04W 36/0066 455/439 |
| 2015/0271783 A1* | 9/2015 | Hu | H04W 68/02 455/458 |
| 2015/0327142 A1* | 11/2015 | Martinez Tarradell | H04W 4/70 455/436 |
| 2015/0351135 A1* | 12/2015 | Schmidt | H04W 76/10 455/450 |
| 2015/0381260 A1* | 12/2015 | Chiba | H04W 8/26 370/315 |
| 2016/0007211 A1* | 1/2016 | Mochizuki | H04W 92/20 455/449 |
| 2017/0164349 A1* | 6/2017 | Zhu | H04W 40/20 |
| 2018/0041994 A1* | 2/2018 | Zhang | H04L 45/02 |
| 2018/0167838 A1* | 6/2018 | Mitsui | H04W 16/32 |
| 2018/0242304 A1* | 8/2018 | Rong | H04W 40/20 |
| 2018/0255507 A1* | 9/2018 | Nagasaka | H04W 48/16 |
| 2019/0045351 A1* | 2/2019 | Zee | H04W 8/06 |
| 2019/0075578 A1* | 3/2019 | Kim | H04B 17/364 |
| 2019/0158360 A1* | 5/2019 | Xu | H04W 92/20 |
| 2019/0174561 A1* | 6/2019 | Sivavakeesar | H04W 48/12 |

OTHER PUBLICATIONS

Nokia, et al., "Solutions for for Network Slice Selection", 3GPP TSG-RAN WG3 Meeting #92, Nanjing, China, May 23-27, 2016, R3-161356.

Nokia, et al., Key principles for Slice Selection Support in RAN, 3GPP TSG-RAN WG3 Meeting #91bis, Bangalore, India, Apr. 11-15, 2016, R3-160735.

Samsung, "Network slicing selection," 3GPP TSG-RAN WG3 Meting #92, Nanjing, China, May 23-27, 2016, R3-161065.

Huawei, et al., Update of Solution #1 for Key issue #1, 3GPP SA WG2 Meeting #114, Apr. 11-15, 2016, Sophia Antipolis, France, S2-161503.

Da Silva, Icaro et al., "Impact of Network Slicing on 5G Radio Access Networks," ICC 2016.

Next Generation Mobile Networks, "NGMN 5G White Paper," Feb. 17, 2015.

Ericsson, "5G Systems," Ericsson White Paper, Jan. 2015.

Ericsson, "The Real-Time Cloud," Ericsson White Paper, Feb. 2014.

3GPP, 3rd Generation Partnership Project; Technical Specification Group Services and System Aspects; Feasibility Study on New Services and Markets Technology Enablers; Stage 1 (Release 14), TR 22.891 V1 0.0, Sep. 2015.

China Mobile, et al., "Proposal for Study on a Next Generation System Architecture," S2-153651, 3GPP SA WG2 Meeting #11, ChengDu, China, Oct. 19-23, 2015.

3GPP, 3rd Generation Partnership Project; Technical Specification Group GSM/EDGE Radio Access Network; Cellular System Support for Ultra Low Complexity and Low Throughput Internet of Things; (Release 13), TR 45.820 V1.3.1, Jun. 2015.

* cited by examiner

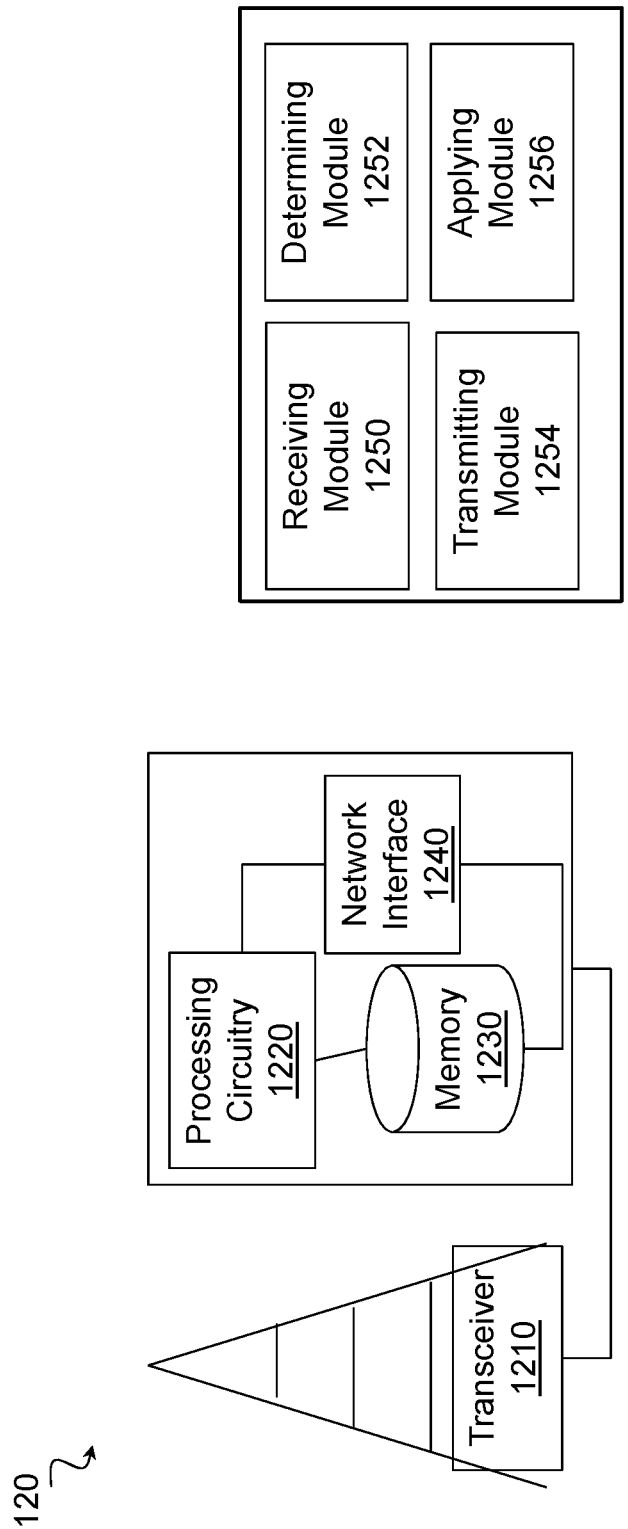

NETWORK SLICING-AWARE ACCESS NETWORK

This application is a 371 of International Application No. PCT/IB2017/056296, filed Oct. 12, 2017, which claims the benefit of U.S. Application No. 62/406,442, filed Oct. 11, 2016, the disclosures of which are fully incorporated herein by reference.

TECHNICAL FIELD

Certain embodiments of the present disclosure relate, in general, to wireless communications and, more particularly, to an access network that is aware of network slicing.

INTRODUCTION

Third Generation Partnership Project (3GPP) networks may include network slicing in long term evolution (LTE) and 5G new radio (NR) networks. The term NX may be used herein to refer to the new radio access technology introduced beside LTE in 5G systems. This is not an agreed to term, but rather one that is used herein for simplicity. The actual term used by 3GPP may vary but does not change the applicability of the concepts, features, and benefits described herein.

The concept of network slicing is part of the evolution of LTE based systems into future generation mobile networks. Network slicing is an important part of the next generation mobile network's (NGMN) vision for the 5G architecture that includes deployment of multiple logical networks as independent business operations on a common physical infrastructure. One goal is to provide network slices on an "as-a service" basis to meet the performance requirements of the wide range of use cases that the 2020 timeframe will demand (e.g., for various different industries).

The deployment of network slices is mainly business driven and addresses the needs of different 5G use cases with highly diverging requirements. A network slice may support the communication service of a particular connection type possibly with a specific way of handling control plane and user plane for this service. To this end, a "5G slice" may include a collection of 5G network functions (NF) and specific air interface/radio access technology (RAT) settings that are combined together for a specific use case and/or business model.

A slice may be seen from an end customer perspective or slice customer as an independent network. However, in contrast to deploying an independent network infrastructure, each slice will be realized together with other slices on a common infrastructure (also referred to as "virtual network"), that also includes common assets such as licensed spectrum.

In this way, the infrastructure and assets utilization will be more cost and energy efficient compared to present realizations. The concept of network slicing is initially proposed for the 5G core network (CN). Using software-defined networking (SDN) and NF virtualization (NFV) principles, a fully virtualized core network (CN) instance optimized per business purpose may be defined. The concept may also include NGMN end-to-end (E2E) network slicing. This is described in 3GPP study items where the network slicing primarily targets a partition of the CN, but it is not excluded that the radio access network (RAN) may need specific functionality to support multiple slices or even partitioning of resources for different network slices.

The support for E2E network slicing appears as a 3GPP requirements, but it is still unclear what network slicing would represent to the RAN design, for example, which includes both network side and User Equipment (UE). One step to understand the impact of network slicing to the 5G RAN design includes identifying RAN specific requirements needed to fulfil the network slicing vision. The derived set of requirements includes the following: (a) utilization of RAN resources, such as radio resources (e.g., time, frequency, power) and hardware (HW)/software (SW) platforms, should be maximized among multiple slices; (b) RAN should be slice-aware via some explicit or implicit identification (e.g., based on an abstraction model); (c) RAN should support mechanisms for traffic differentiation to be able to treat different slices differently and/or different services within the multi-service slices; (d) RAN should support protection mechanisms for slice isolation so that events (such as congestion) within one slice do not have a negative impact on another slice; and (e) RAN should support efficient management mechanisms (e.g., to efficiently setup new slices and to efficiently operate new business/services).

FIG. 1 is a block diagram illustrating the architecture of an example LTE system. The example includes radio access nodes (eNBs, Home eNBs—HeNBs, HeNB GW) and evolved packet core nodes (MME/S-GW). The example illustrates logical interfaces between eNBs and HeNBs (X2) and between eNB/HeNBs and MME/S-GW (S1). For example, an S1 interface connects HeNBs/eNBs to the MME/S-GW and HeNBs to the HeNB GW, and an X2 interface connects peer eNBs/HeNBs, optionally via an X2 GW.

FIG. 2 is a block diagram illustrating an example management architecture of an LTE system. The node elements (NE), also referred to as eNodeB, are managed by a domain manager (DM), also referred to as the operation and support system (OSS). A DM may further be managed by a network manager (NM). Two NEs are interfaced by X2. The interface between two DMs is referred to as Itf-P2P.

The management system may configure the network elements, as well as receive observations associated to features in the network elements. For example, DM observes and configures NEs, while NM observes and configures DM, as well as NE via DM. By means of configuration via the DM, NM and related interfaces, functions over the X2 and S1 interfaces can be carried out in a coordinated way throughout the RAN, eventually involving the Core Network, i.e. MME and S-GWs.

LTE is evolving and 3GPP has not yet specified if or how the LTE architecture will evolve to meet the challenges of the 5G time frame. Particular assumptions, however, may include evolved counterparts of the S1, X2 and Uu interfaces and that any new RAT will be integrated with the LTE radio interface at RAN level in a similar fashion as the way LTE Dual Connectivity is defined. The embodiments disclosed herein may apply for both an LTE-like architecture, an NX architecture, and a new architecture based on an evolution of the S1 interface.

5G RAN architecture may include novel interfaces (e.g., between some synchronous and asynchronous functionalities). Different discussions are ongoing in the industry about a possible future evolution of the current RAN architecture. From a starting point in a macro site based topology the introduction of low power cells, the evolution of the transport network between the different radio base station sites, the radio base station hardware evolution, the increased need for processing power and so on, have given rise to new challenges and opportunities.

Several strong forces are at work on the RAN architecture, pulling in sometimes different directions. Some, who like the gains of coordination, hardware pooling gains, energy saving gains and the evolution of the backhaul/fronthaul network are working in favor of a more centralized deployment, while others are working towards de-centralization, such as very low latency requirements for some 5G use cases such as mission critical machine type communication (MTC) applications. The terms fronthaul and backhaul are used in relation to the base station. The traditional definition for fronthaul is the common public radio interface (CPRI)-based fiber link between the baseband (Main Unit) and the Radio Unit. The backhaul refers to the transport network used for S1/X2-interfaces.

The recent evolution in backhaul/fronthaul has indeed opened up the possibility to centralize the baseband, often referred to as C-RAN. C-RAN is a term that can be interpreted in different ways. For some it means a "baseband hotel" like solutions in which the basebands from many sites are collocated to a central site but there is no tight connection and fast exchange of data between the sites. The most common interpretation is maybe "Centralized RAN" where there is at least some kind of coordination between the basebands.

A potentially attractive solution is the smaller centralized RAN that is based on a macro base station and the lower power nodes covered by it. In this configuration, a tight coordination between the macro and the low power nodes can often give considerable gains. The term "Coordinated RAN" is an often used interpretation that focuses on the coordination gains of the centralization. Other more futuristic interpretations of C-RAN include "cloud" based and "virtualized" RAN solutions where the radio Network functionality is supported on generic hardware (general purpose processors) and possibly as virtual machines.

A centralized deployment can be driven by one or several forces, such as a possible ease of maintenance, upgrade and less need for sites as well as harvesting of coordination gains. A common misconception is that there is a large pooling gain and a corresponding hardware saving to be done by the centralization. The pooling gain is large over the first number of pooled cells, but then diminishes quickly. One advantage of having the basebands from a larger number of sites co-located and interconnected is the tight coordination that it facilitates. Examples of these are uplink coordinate multipoint (CoMP) and combining several sector/carriers into one cell. The gains of these features can sometimes be significant in relation to the gains of looser coordination schemes such as, for example, enhanced Inter-cell interference coordination (eICIC) that can be done over standard interfaces (e.g., X2) without co-location of the baseband.

An attractive C-RAN deployment from a coordination gain perspective is the C-RAN built around a larger macro site, normally with several frequency bands, and a number of lower power radios, covered by the macro site, that are tightly integrated into the macro over high-speed interconnect. The largest gains are expected to be seen in deployment scenarios such as stadiums and malls. An important consideration for any C-RAN deployment is the transport over the fronthaul (i.e., the connection between the centralized baseband part and the radios, "the first mile"). The cost of the fronthaul, which varies rather greatly between markets, needs to be weighed against the benefits. Future discussions in 3GPP may lead to a RAN functional split as shown in FIG. 3.

FIG. 3 is a block diagram illustrating grouping of asynchronous and synchronous functions of the network. As illustrated, the RAN functions are classified in synchronous (placed in a logical node labelled as eNB-s) and asynchronous (placed in a logical node labelled as eNB-a) functions. The instances of functions associated to the eNB-s (i.e., the synchronous functions (SFs)) are placed at the closest node to the air interfaces. These will form what is called a synchronous functional group (SFG).

The instances of the asynchronous functions (AFs) associated to the eNB-a can be flexibly instantiated either at a closest node to the air interface (i.e., the same node where the eNB-s functions are instantiated) or in fixed network nodes (FNNs).

Regarding evolution of 5G core network architecture, several architecture options are described and documented in 3GPP TR 23.799v1.0.2. Reproduced below is Option 6, which reflects an option that will likely be modified in the course of the ongoing study and thus modifications can be expected. The reproduction below is section 7.6 from 3GPP TR 23.799v1.0.2:

7.6.1 General

The NextGen network reference architecture should consider the following aspects:

1) Support 5G use cases and service requirements
2) Enable Operational agility (enable extreme automation (faster deployments, upgrades, reduce TCO)
3) Allow independent evolution of different parts of the network (e.g., access and core).

Key Architecture Principles:

Abstract the transport domain from 3GPP network functions to allow for independent evolution and to enable operators to use different transport technologies (e.g., Ethernet, MPLS, SDN-based transport, etc.). 3GPP network functions should neither mandate nor rule out support for any of these technologies in the transport domain.

Allow scalability of UP and CP functions independently.

Allow for a flexible deployment of UP separate from the CP, i.e. central location or distributed (remote) location (i.e. with no restriction in the location).

Support transmission of different PDU types, e.g., IP, Ethernet.

Separation of functions including subscription database from functions providing the end user service.

Separation of Policy function to govern the network behaviour and end user experience.

Allows for different network configurations in different network slices.

Control Plane:

It is important for the UE to trust that certain functionalities are supported in the network thus important to enable multi-vendor interworking between UE and network functions. However, from the UE perspective, it is irrelevant how and where it exists within the network (e.g., which function module or software supports a certain function).

It is important to enable multi-vendor interworking between radio and network functions within the core network and between the network functions within the core network. At the same time, it is sufficient if a single interface is exposed towards the radio while abstracting the modular (elementary) functions supported in the core network.

User Plane:

A generic user-plane function (UP function) is defined, which supports various user-plane operations (incl. forwarding operations to other UP functions/data networks/the control-plane, bitrate enforcement operations, service detection operations, etc.)

The control plane configures the UP functions to provide the traffic handling functionality needed for a session. One or multiple UP functions per session can be activated and configured by the control-plane as needed for a given user-plane scenario.

To support low latency services and access to local data networks, user plane functions can be deployed close to the radio. For central data networks, UPFs can be deployed centrally.

Concurrent access to local and centralized services is supported as follows

Multiple PDU sessions to both a local UP function (providing access to local data networks) and a central UP function (providing access to central data networks); or A single PDU session, for which the control plane has configured two UP functions: one UP function performing traffic classification and traffic steering towards either the local data network or the central data network, the other UP function providing access to the central data network (as depicted in FIG. 7.6.2-3).

The control plane can also configure multiple UP functions in the single PDU session case for local data network access.

7.6.2 Reference Architecture

Figure 7.6.2-1 (reproduced here as FIG. 4) depicts the non-roaming architecture functional view.

Figure 7.6.2-2 (reproduced here as FIG. 5) depicts the non-roaming architecture for UEs concurrently accessing a local and a central data network using multiple PDU Sessions.

Figure 7.6.2-3 (reproduced here as FIG. 6) depicts the non-roaming architecture in case concurrent access to local and central data networks is provided within a single PDU session.

Figure 7.6.2-4 (reproduced here as FIG. 7) depicts the roaming architecture in case of home routed scenario.

Following Figure 7.6.2-5 (reproduced here as FIG. 8) depicts the roaming architecture in case of local break out scenario.

In some scenarios, the choice between NG6* and NG6 depends on whether the PDU Session has a single IP address/prefix or multiple IP address/prefixes. It is for future study to determine whether both types need to be supported. Whether the distinction between NG6 and NG6* is needed is also for future study. In certain scenarios, the interconnection model for all control plane network functions is also for future study. In particular scenarios, need for NG8 from H-SMF to NG-SDM (i.e. in the home routed scenario) is for future study. Regardless of the number of CCFs, there is only one NAS interface instance between the UE and the CN, terminated at one of the CCFs that implements at least access authentication and mobility management. In some scenarios, criteria to select multi-vendor open (standardized) interfaces should be determined.

7.6.3 Network Functions and Reference Points

The 5G Reference Architecture consist of the following functions:

NG Subscriber Data Management (NG SDM)
NG Authentication Server and Credential Repository (NG ASR)
NG Policy Control function (NG PCF)
NG Core Mobility Management Function (NG MMF)
NG Core Session Management Function (NG SMF)
NG Authentication Function (NG AUF)
NG Core User plane function (NG UPF)
NG RAN
NG UE
Data network (e.g., operator or 3rd party services, Internet access, etc.)

The following is a high level split of functionality between the control plane and the user plane.

The NG Mobility Management function (MMF) includes the following functionality:
Termination of RAN CP interface (NG2)
Termination of NAS (NG1), NAS ciphering and integrity protection
Mobility Management
Lawful intercept (for MM events and interface to LI System)
Transparent proxy for routing access authentication and SM messages.

The NG Authentication function (AUF) includes the following functionality:
Access Authentication
Derivation of keys required by other functions of NGC for serving the UE.
AUF functionality and roaming architecture may need to be updated.

The NG Session Management function (SMF) includes the following functionality:
Session Management
UE IP address allocation & management (including optional Authorization)
Selection and control of UP function
Termination of interfaces towards Policy control and Charging functions
Policy & Charging rules handling, including control part of enforcement and QoS
Lawful intercept (for SM events and interface to LI System)
Not all of the MMF, SMF, AUF functions are required to be supported in an instance of CCFs of a network slice.

The NG Core User plane function includes the following functionality:
Anchor point for Intra-/Inter-RAT mobility (when applicable)
External PDU session point of interconnect (e.g., IP).
Packet routing & forwarding
QoS handling for User plane
Packet inspection and Policy rule enforcement
Lawful intercept (UP collection)
Traffic accounting and reporting
Not all of the UPF functions are required to be supported in an instance of user plane function of a network slice.

The NG Policy function includes the following functionality:
Supports unified policy framework to govern network behaviour.
Provides policy rules to control plane function(s) to enforce them.
The need for an interface between NG Policy Function and SDM is for future study.

The NG ASR supports the following functionality:
Authentication Credential Repository and Processing Function—This function stores the long-term security credentials used in authentication.

Authentication Server Function (AUS)—This function interacts with the AUF.

ASR functionality needs to be updated based on outcome of SA3 work on Security framework for NextGen.

The NG SDM supports the following functionality:

Subscription repository.

The 5G Reference Architecture contain the following reference points:

NG1: Reference point between the UE and the NG Mobility Management function.

NG2: Reference point between the RAN and the NG Mobility Management function.

NG3: Reference point between the RAN and the NG Core User plane function.

NG4: Reference point between the NG Core Session Management function and the NG Core User plane function.

NG5: Reference point between the NG Core Session Management function and an Application Function.

NG11: Reference point between Mobility Management function and Session Management function.

NG12: Reference point between Mobility Management function and Authentication function.

NGt: Reference point between Authentication function and ASR function.

NG6: Reference point between the NG Core UP functions and a Data Network (DN).

NG6*: Reference point between a NG Core UP function and a local Data Network (when concurrent access to both a local and central data network is provided for one PDU session with a single IP address/prefix).

Details of NG6* mechanism are beyond the scope of 3GPP.

NG7: Reference point between the NG Session Management function and the NG Policy Control function.

NG8: Reference point between the NG Mobility Management function, Authentication function and the Subscriber Data Management.

NG9: Reference point between two NG Core User plane functions.

NG7r: Reference point between the V-PCF and the H-PCF.

NG-RC: Reference point between the V-SMF and the H-SMF.

Network slicing creates logically separated partitions of the network, addressing different business purposes. The network slices are logically separated to a degree that they can be regarded and managed as networks of their own. Network slices can be associated to different slice tenants, namely entities that provide services to the end user via the network slice. Example of slice tenants could be the armed forces, e.g., providing Voice services via a dedicated network slice; vehicles manufacturers, e.g., providing vehicle diagnostic services via a dedicated network slice; and more. It is also common to associate a service level agreement (SLA) to each network slice. An SLA indicates the treatment to which services provided within the network slice should be subjected.

Network slicing is a new concept that applies to both LTE Evolution and new 5G RAT (in this document called NR). The key driver for introducing network slicing is business expansion, i.e. improving the cellular operator's ability to serve other industries, e.g., by offering connectivity services with different network characteristics (performance, security, robustness, and complexity).

The current working assumption is that one shared RAN infrastructure will connect to several Core Network instances, such as Evolved Packet Core (EPC) instances (one EPC instance per network slice) or a further EPC evolution. Although a one to one mapping between slice and CN Instance, where an instance is a CN node, may exist, concepts, features, aspects may be equally applicable to multiple slices supported by the same CN instance. Because the CN functions (e.g., EPC functions) are being virtualized, an operator may instantiate a new core network (CN) when a new slice should be supported. In another case, the network slices could be implemented based on existing monolithic EPC architecture based on special purpose hardware. An example is illustrated in FIG. 9

FIG. 9 is a block diagram illustrating example network slices. Slice 0 may be, for example, a Mobile Broadband slice and Slice 1 may be, for example, a Machine Type Communication network slice.

FIG. 10 is a block diagram illustrating a user equipment (UE) connected to multiple slices. The UE has a single NAS termination point at Common CP Function (CCF). This results in RAN having a single Control Plane (CP) interface for the UE. The User Plane (UP) is illustrated as being separated one per Core Network Instance (CNI).

When it comes to one physical RAN used for multiple network slices, two aspects should be taken into account. The first aspect is that network slicing should make it possible to support several different virtual networks on the same physical network infrastructure to reduce costs and energy consumption, compared to deploying separate physical networks for the different use case or business scenarios. To fully take advantage of the benefit, the slicing concept should facilitate efficient usage of common resources such as radio resources and infrastructure, and transport links between the slices such as fronthaul and backhaul.

The second aspect is that mechanisms should protect common channels or resources used for UEs accessing the system so that congestion in one slice does not have a negative impact on another slice (often referred to as slice isolation). Currently a 3GPP system includes some support for protecting common control channels from extensive load from different services. These mechanisms include Access Class Barring, Enhanced Access Barring, Service Specific Access Barring, as well as implementation specific admission control, etc. These are described in the next section.

While it is understood that RAN needs to be slice aware, i.e. understand if some UE uses services over a certain slice, e.g., for MBB or Critical Communication, it is not yet understood how that information is disseminated to the relevant entities.

With the adoption of network slicing, it will be possible that two (or more) different slices contain all the services, which exist today, but there will still be the need to differentiate access because two (or more) slices represent different SLAs. In fact, some scenarios may include the same type of service provided by different slices associated with SLAs with different slice tenants. This may lead to more slices and to a further need for slice awareness information at the RAN.

At the same time, because of the resulting signalling overhead, it is an increasing problem that more and more information has been added to the System Information Broadcast mechanism over subsequent 3GPP releases. Thus, any solution to this problem needs also to consider how to introduce the differentiation when it comes to the way to code the information and signal it over the radio interface.

Further, there are 3GPP requirements to support both the scenario that one UE always accesses only one Network Slice, as well as the scenario that some UEs access more than one network slices simultaneously. Some entities in the CN may be common for all the network slices e.g., the MMF (Mobility Management Function) for 5G and MME for EPS.

- A "CN Slice ID" is information provided from the UE to the CN required to allocate CN resources for a realization of a specific slice, e.g., to realize a slice for automotive type of services for a given tenant.
- A "RAN Slice ID" points at a specific RAN configuration in full or partial, e.g., RRM for a realization of the RAN-part of that end-to-end slice and for fulfilment of the SLA for that slice and that slice tenant.

SUMMARY

Particular embodiments facilitate network slice awareness in the RAN. According to some embodiments, a method for use in a core network node of associating network slice identifiers comprises: obtaining a mapping of core network (CN) slice identifiers to radio access network (RAN) slice identifiers; receiving a slice registration request from a user equipment (UE); determining a slice identifier associated with the slice registration request; and sending a slice registration response to the UE. The slice registration response includes the determined slice identifier.

In particular embodiments, obtaining the mapping of CN slice identifiers to RAN slice identifiers comprises receiving the mapping via provisioning from an operation and support system (OSS). In some embodiments, obtaining the mapping of CN slice identifiers to RAN slice identifiers comprises receiving a setup request from a network node, and sending a setup response to the network node. The setup response comprises a CN slice identifier. The obtaining may further comprise receiving a configuration update from the network node. The configuration update comprises the mapping of CN slice identifiers to RAN slice identifiers. In some embodiments, obtaining the mapping of CN slice identifiers to RAN slice identifiers comprises receiving a setup request from a network node. The setup request comprises one or more RAN slice identifiers. The obtaining further comprises mapping the one or more RAN slice identifiers to CN slice identifiers. The setup request may comprise an S1 Setup Request message.

In particular embodiments, the slice registration request includes a CN slice identifier, and determining a slice identifier associated with the slice registration request comprises determining a RAN slice identifier associated with the CN slice identifier included in the slice registration request. Determining a slice identifier associated with the slice registration request may comprise: inspecting UE subscriber information to determine a CN slice identifier associated with the slice registration request; and determining a RAN slice identifier associated with the CN slice identifier associated with the slice registration request.

In particular embodiments, the slice identifier may comprise a local slice identifier relative to the UE. The slice identifier may comprise one of a temporary or dedicated core network node identifier. The slice registration response may include one or more services associated with the slice identifier.

In particular embodiments, the slice registration request and the slice registration response comprise non access stratum (NAS) messages. In some embodiments, the slice registration response comprises an access stratum (AS) message.

According to some embodiments, a core network node capable of associating network slice identifiers comprises processing circuitry. The processing circuitry is operable to: obtain a mapping of CN slice identifiers to RAN slice identifiers; receive a slice registration request from a UE; determine a slice identifier associated with the slice registration request; and send a slice registration response to the UE. The slice registration response includes the determined slice identifier.

In particular embodiments, the processing circuitry is operable to obtain the mapping of CN slice identifiers to RAN slice identifiers by receiving the mapping via provisioning from an OSS. In some embodiments, the processing circuitry is operable to obtain the mapping of CN slice identifiers to RAN slice identifiers by receiving a setup request from a network node, and sending a setup response to the network node. The setup response comprises a CN slice identifier. The processing circuitry is further operable to receive a configuration update from the network node. The configuration update comprises the mapping of CN slice identifiers to RAN slice identifiers. In some embodiments, the processing circuitry is operable to obtain the mapping of CN slice identifiers to RAN slice identifiers by receiving a setup request from a network node. The setup request comprises one or more RAN slice identifiers. The processing circuitry is further operable to map the one or more RAN slice identifiers to CN slice identifiers. The setup request may comprise an S1 Setup Request message.

In particular embodiments, the slice registration request includes a CN slice identifier, and the processing circuitry is operable to determine the slice identifier associated with the slice registration request by determining a RAN slice identifier associated with the CN slice identifier included in the slice registration request.

In particular embodiments, the processing circuitry is operable to determine the slice identifier associated with the slice registration request by inspecting UE subscriber information to determine a CN slice identifier associated with the slice registration request, and determining a RAN slice identifier associated with the CN slice identifier associated with the slice registration request.

In particular embodiments, the slice identifier may comprise a local slice identifier relative to the UE. The slice identifier may comprise one of a temporary or dedicated core network node identifier. The slice registration response may include one or more services associated with the slice identifier.

In particular embodiments, the slice registration request and the slice registration response comprise NAS messages. In some embodiments, the slice registration response comprises an AS message.

According to some embodiments, a method for use in a network node of associating network slice identifiers comprises obtaining a mapping of CN slice identifiers to RAN slice identifiers. Obtaining the mapping of CN slice identifiers to RAN slice identifiers may comprise receiving the mapping via provisioning from an OSS. In some embodiments, obtaining the mapping of CN slice identifiers to RAN slice identifiers comprises sending a setup request to a core network node. The setup request includes one or more RAN slice identifiers. The obtaining further comprises receiving a setup response from the core network node. The setup response includes the mapping of CN slice identifiers to RAN slice identifiers. The setup request may comprise an S1 Setup Request message.

In particular embodiments, the method further comprises receiving a slice registration response from a core network node. The slice registration response includes a CN slice identifier. The method further comprises determining a RAN slice identifier using the CN slice identifier and the obtained mapping of CN slice identifiers to RAN slice identifiers; and sending the determined RAN slice identifier to a UE. Sending the determined RAN slice identifier to the UE may comprise sending an access stratum (AS) message to the UE.

In particular embodiments, the method further comprises determining one or more RAN slice identifiers associated with a UE; mapping each of the determined one or more RAN slice identifiers to a local slice identifier relative to the UE; and sending the one or more local slice identifiers to the UE.

In particular embodiments, the method further comprises receiving a connection request from the UE. The connection request includes a local slice identifier. The method further comprises determining a RAN slice identifier based on the local slice identifier in the connection request; and applying a policy of a network slice associated with the determined RAN slice identifier to the requested connection.

In particular embodiments, the method further comprises receiving a connection request from a UE. The connection request includes a slice identifier. The method further comprises applying a policy of a network slice associated with the slice identifier to the requested connection. The slice identifier may include at least one of a RAN slice identifier, a CN slice identifier, a temporary core network node identifier, a dedicated core network node identifier, and a service identifier.

According to some embodiments, a network node capable of associating network slice identifiers comprises processing circuitry. The processing circuitry is operable to obtain a mapping of CN slice identifiers to RAN slice identifiers. In some embodiments, the processing circuitry receives the mapping via provisioning from an operation and support system. In some embodiments, the processing circuitry sends a setup request to a core network node. The setup request includes one or more RAN slice identifiers. The processing circuitry receives a setup response from the core network node. The setup response includes the mapping of CN slice identifiers to RAN slice identifiers. The setup request may comprise an S1 Setup Request message.

In particular embodiments, the processing circuitry is further operable to receive a slice registration response from a core network node. The slice registration response includes a CN slice identifier. The processing circuitry is operable to determine a RAN slice identifier using the CN slice identifier and the obtained mapping of CN slice identifiers to RAN slice identifiers; and send the determined RAN slice identifier to a UE (e.g., send an access AS message to the UE).

In particular embodiments, the processing circuitry further is operable to: determine one or more RAN slice identifiers associated with a UE; map each of the determined one or more RAN slice identifiers to a local slice identifier relative to the UE; and send the one or more local slice identifiers to the UE.

In particular embodiments, the processing circuitry is further operable to receive a connection request from the UE. The connection request includes a local slice identifier. The processing circuitry determines a RAN slice identifier based on the local slice identifier in the connection request; and applies a policy of a network slice associated with the determined RAN slice identifier to the requested connection.

In particular embodiments, the processing circuitry further operable to receive a connection request from a UE. The connection request includes a slice identifier. The processing circuitry applies a policy of a network slice associated with the slice identifier to the requested connection. The slice identifier may include at least one of a RAN slice identifier, a CN slice identifier, a temporary core network node identifier, a dedicated core network node identifier, and a service identifier.

According to some embodiments, a method for use in a UE of associating a wireless connection with a network slice comprises sending a slice registration request to a core network node, and receiving a slice registration response from the core network node. The slice registration response includes a slice identifier. The slice registration request may include a CN slice identifier. The slice identifier in the response may include at least one of a RAN slice identifier, a CN slice identifier, a local slice identifier relative to the UE, a temporary core network node identifier, a dedicated core network node identifier, and a service identifier.

In particular embodiments, the slice registration request and the slice registration response both comprise a NAS messages. In some embodiments, the slice registration response comprises an AS message.

In particular embodiments, the method further comprises sending a connection request to a network node. The connection request includes at least one of a RAN slice identifier, a CN slice identifier, a local slice identifier relative to the UE, a temporary core network node identifier, a dedicated core network node identifier, and a service identifier. In some embodiments, the method comprises sending a connection request that includes a network slice class identifier to a network node.

According to some embodiments, a user equipment capable of associating a wireless connection with a network slice comprises processing circuitry. The processing circuitry is operable to send a slice registration request to a core network node, and receive a slice registration response from the core network node. The slice registration response includes a slice identifier. The slice registration response includes a slice identifier. The slice registration request may include a CN slice identifier. The slice identifier in the response may include at least one of a RAN slice identifier, a CN slice identifier, a local slice identifier relative to the UE, a temporary core network node identifier, a dedicated core network node identifier, and a service identifier.

In particular embodiments, the slice registration request and the slice registration response both comprise a NAS messages. In some embodiments, the slice registration response comprises an AS message.

In particular embodiments, the processing circuitry is further operable to send a connection request to a network node. The connection request includes at least one of a RAN slice identifier, a CN slice identifier, a local slice identifier relative to the UE, a temporary core network node identifier, a dedicated core network node identifier, and a service identifier. In some embodiments, the processing circuitry sends a connection request that includes a network slice class identifier.

According to some embodiments, a core network node capable of associating network slice identifiers comprises a receiving module, a determining module, and a transmitting module. The receiving module is operable to obtain a mapping of CN slice identifiers to RAN slice identifiers, and receive a slice registration request from a UE. The determining module is operable to determine a slice identifier associated with the slice registration request. The transmitting module is operable to send a slice registration response to the UE, the slice registration response including the determined slice identifier.

According to some embodiments, a network node capable of associating network slice identifiers comprises a receiving module and a transmitting module. The transmitting module is operable to send a setup request to a core network node. The setup request includes one or more RAN slice identifiers. The receiving module is operable to receive a setup response from the core network node. The setup response includes the mapping of CN slice identifiers to RAN slice identifiers.

According to some embodiments, a user equipment capable of associating a wireless connection with a network slice comprises a receiving module and a transmitting module. The transmitting module is operable to send a slice registration request to a core network node. The receiving module is operable to receive a slice registration response from the core network node. The slice registration response includes a slice identifier.

Also disclosed is a computer program product. The computer program product comprises instructions stored on non-transient computer-readable media which, when executed by a processor, perform the steps of: obtaining a mapping of CN slice identifiers to RAN slice identifiers; receiving a slice registration request from a UE; determining a slice identifier associated with the slice registration request; and sending a slice registration response to the UE. The slice registration response includes the determined slice identifier.

Another computer program product comprises instructions stored on non-transient computer-readable media which, when executed by a processor, perform the steps of obtaining a mapping of CN slice identifiers to RAN slice identifiers. Obtaining the mapping of CN slice identifiers to RAN slice identifiers may comprise receiving the mapping via provisioning from an OSS. In some embodiments, obtaining the mapping of CN slice identifiers to RAN slice identifiers comprises sending a setup request to a core network node. The setup request includes one or more RAN slice identifiers. The obtaining further comprises receiving a setup response from the core network node. The setup response includes the mapping of CN slice identifiers to RAN slice identifiers. The setup request may comprise an S1 Setup Request message.

Another computer program product comprises instructions stored on non-transient computer-readable media which, when executed by a processor, perform the steps of: sending a slice registration request to a core network node, and receiving a slice registration response from the core network node. The slice registration response includes a slice identifier. The slice registration request may include a CN slice identifier. The slice identifier in the response may include at least one of a RAN slice identifier, a CN slice identifier, a local slice identifier relative to the UE, a temporary core network node identifier, a dedicated core network node identifier, and a service identifier.

Certain embodiments of the present disclosure may provide one or more technical advantages. For example, some embodiments enable the RAN to be network slice-aware, which enables a UE to indicate slice specific RAN configuration during connection setup. Particular embodiments minimize extra signaling bits exchanged over the radio interface, while providing the advantages above. Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which:

FIG. 27A is a block diagram illustrating an example embodiment of a network node;

FIG. 27B is a block diagram illustrating example components of a network node;

DETAILED DESCRIPTION

Figure 1:
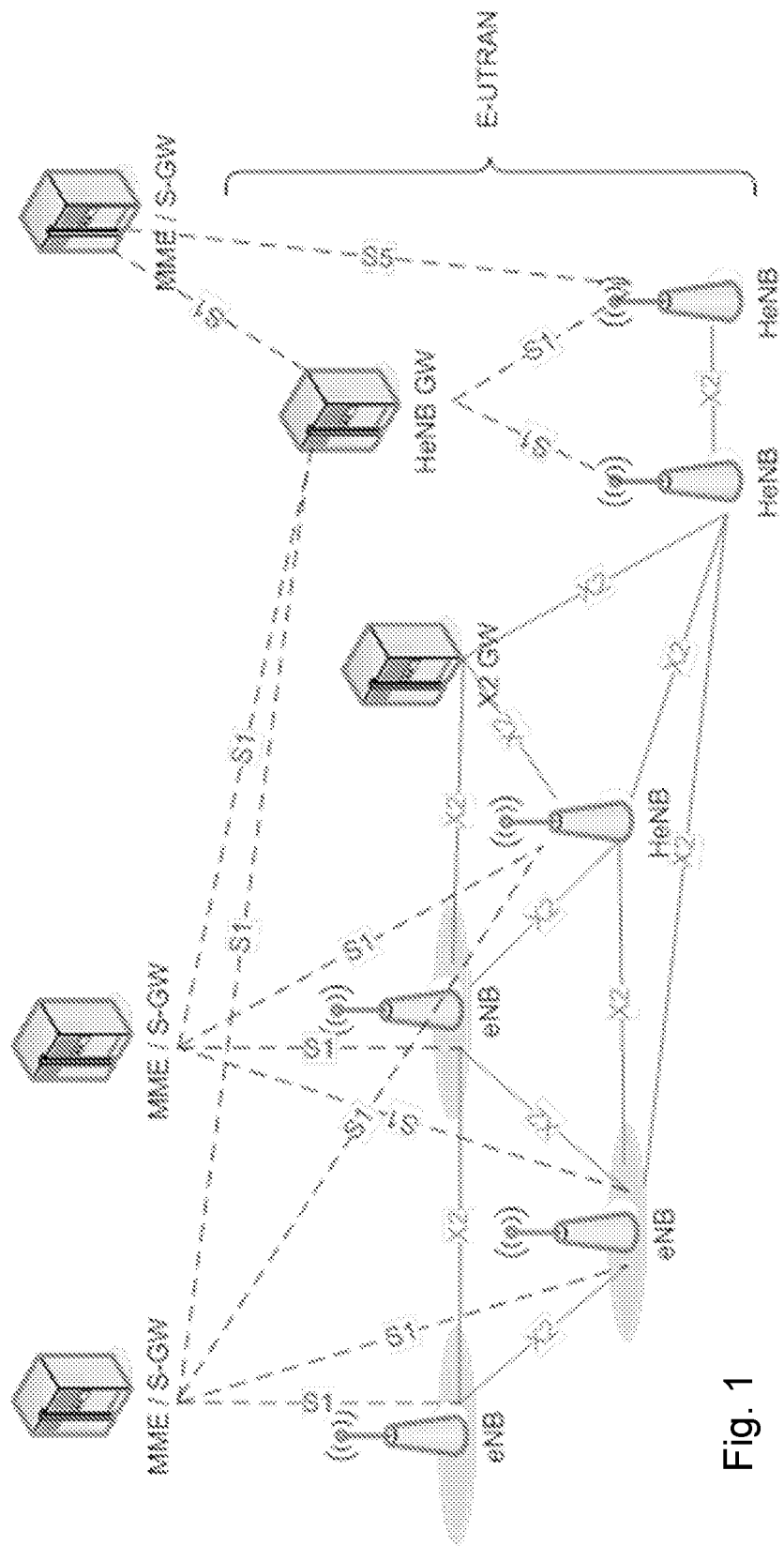
FIG. 1 is a block diagram illustrating the architecture of an example LTE system.
Figure 2:
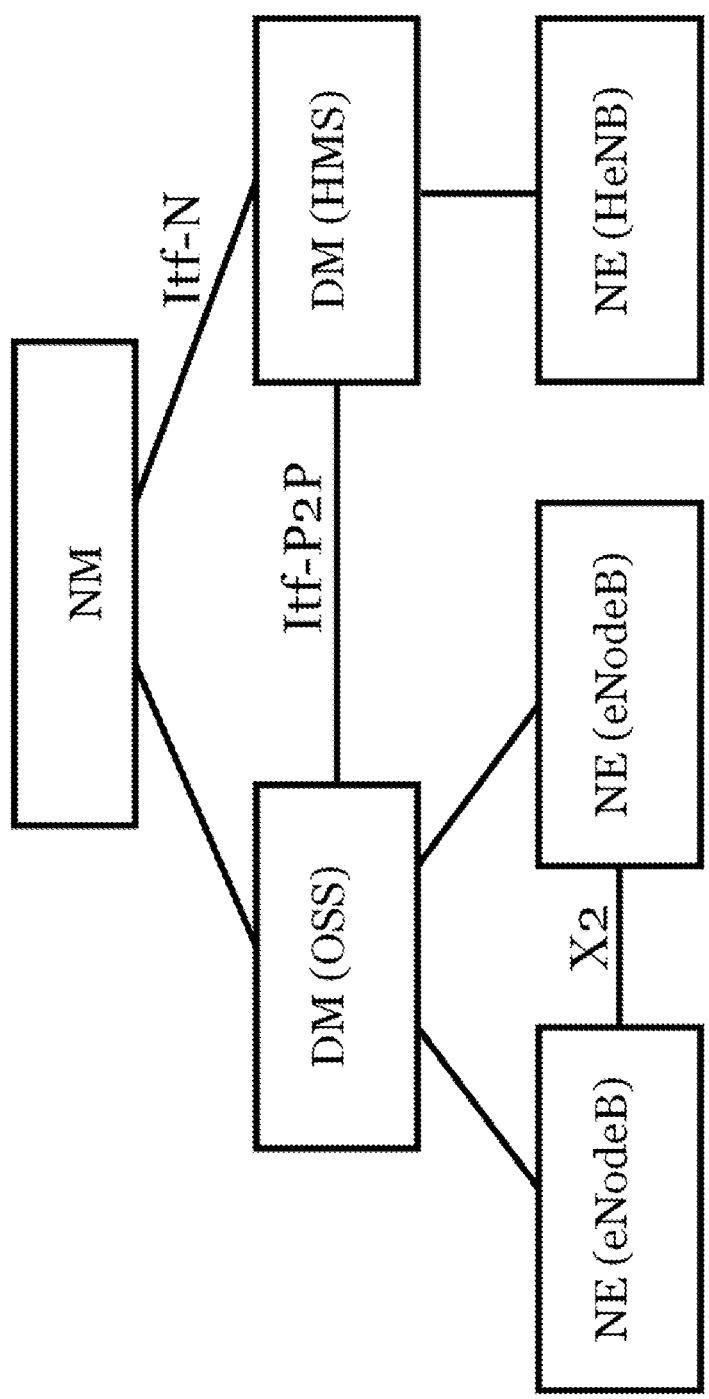
FIG. 2 is a block diagram illustrating an example management architecture of an LTE system.
Figure 3:
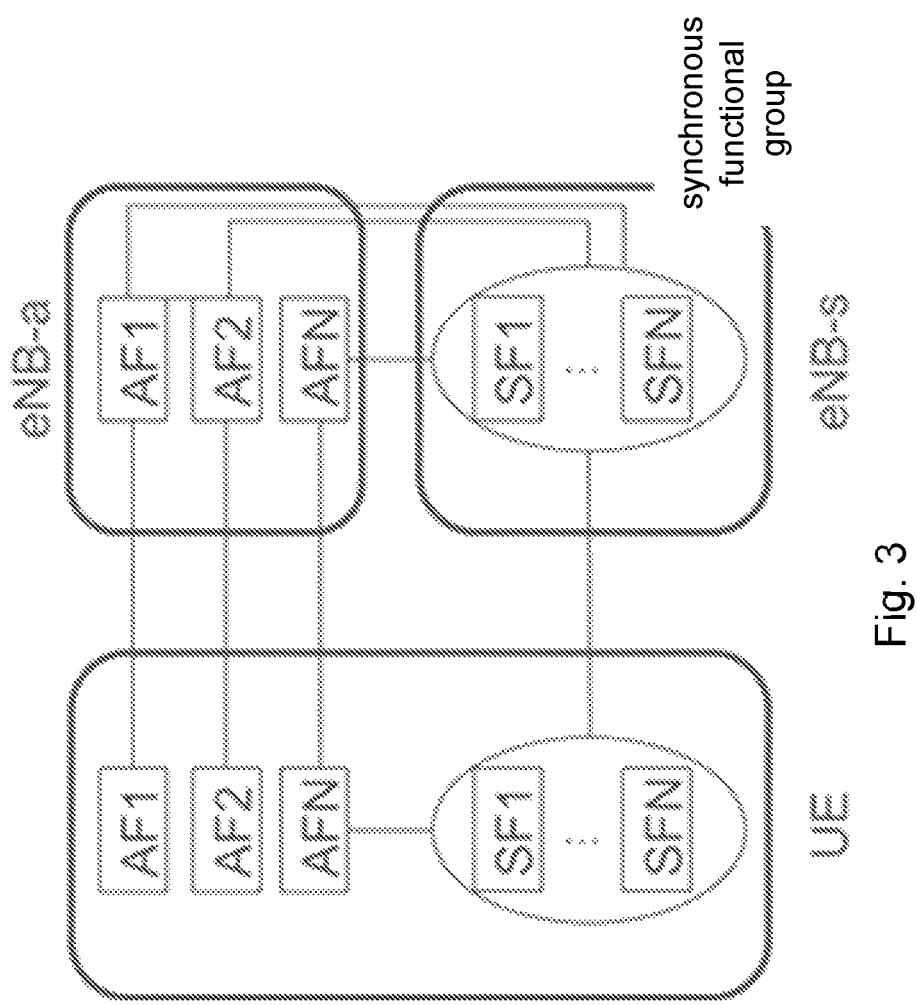
FIG. 3 is a block diagram illustrating grouping of asynchronous and synchronous functions of the network.
Figure 4:
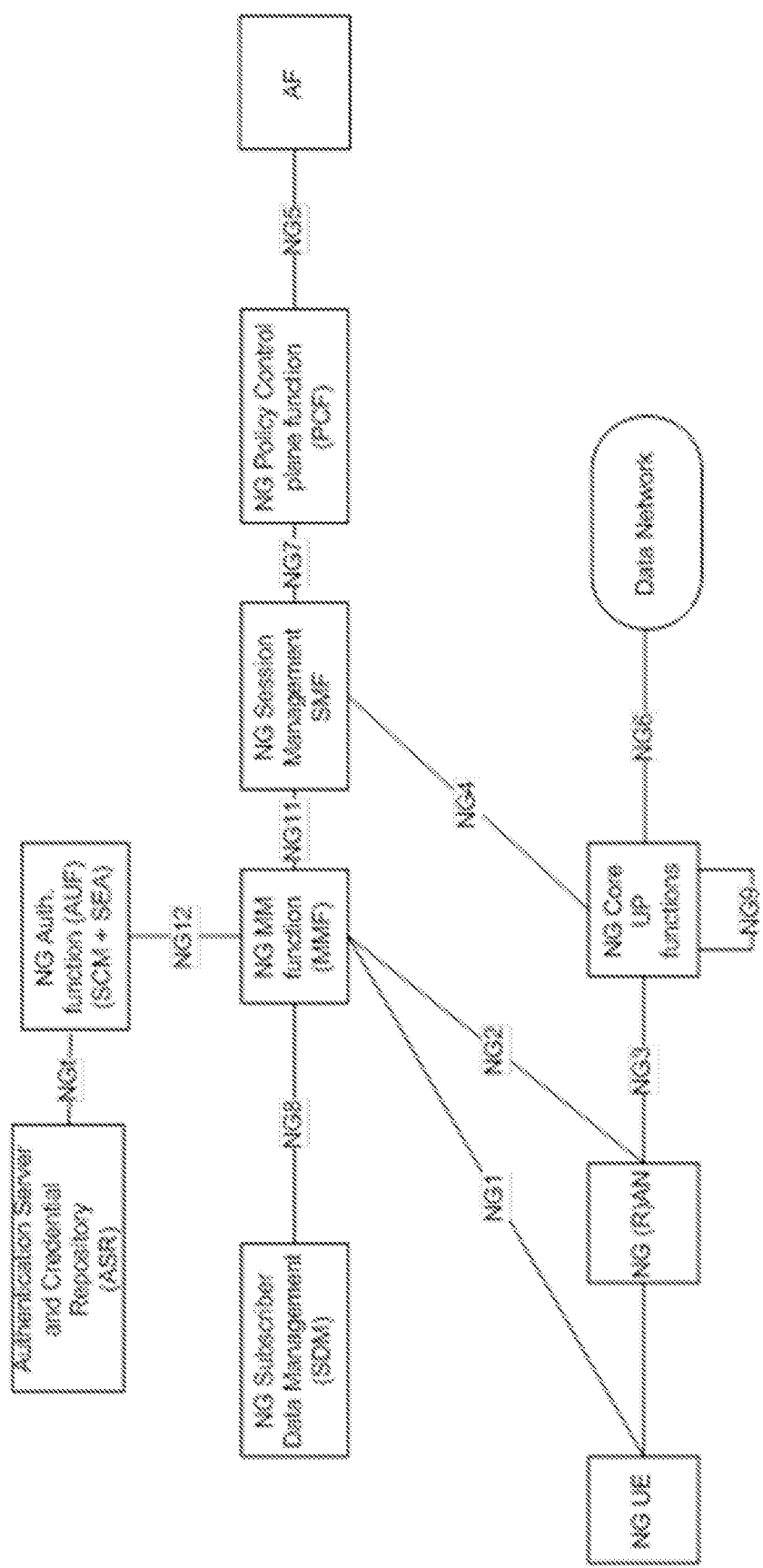
FIG. 4 is a reproduction of Figure 7.6.2-1 from 3GPP TR 23.799v1.0.2.
Figure 5:
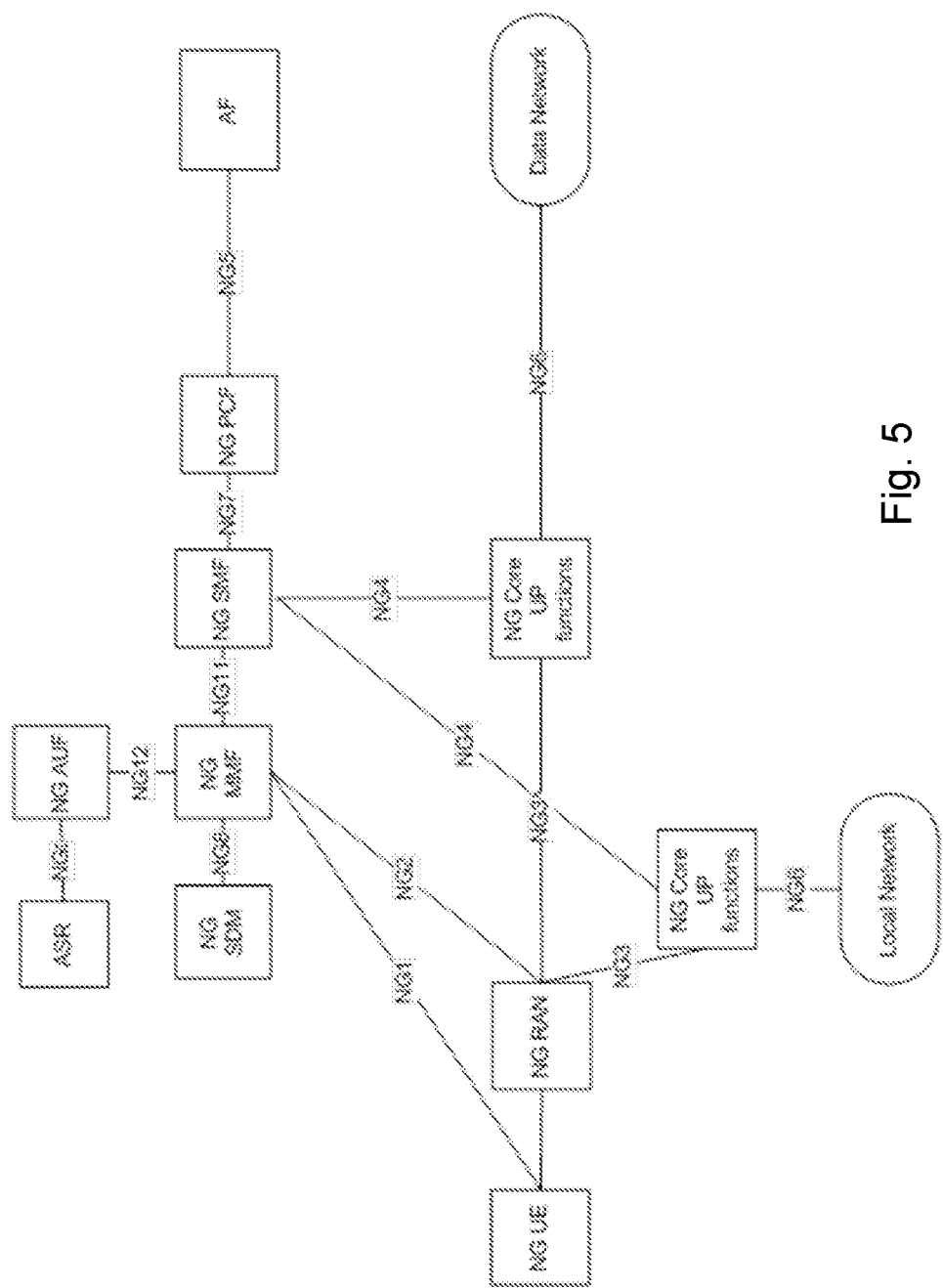
FIG. 5 is a reproduction of Figure 7.6.2-2 from 3GPP TR 23.799v1.0.2.
Figure 6:
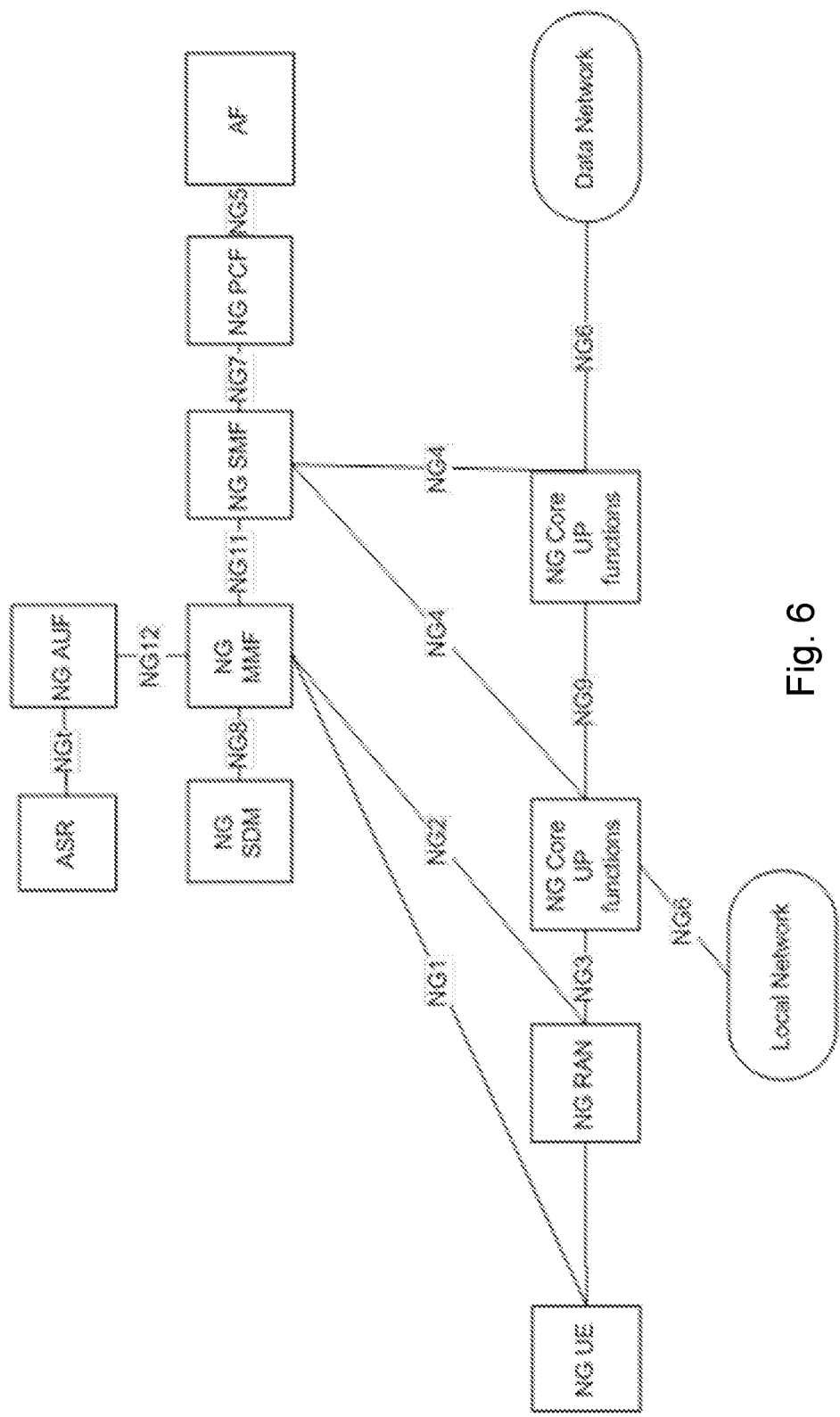
FIG. 6 is a reproduction of Figure 7.6.2-3 from 3GPP TR 23.799v1.0.2.
Figure 7:
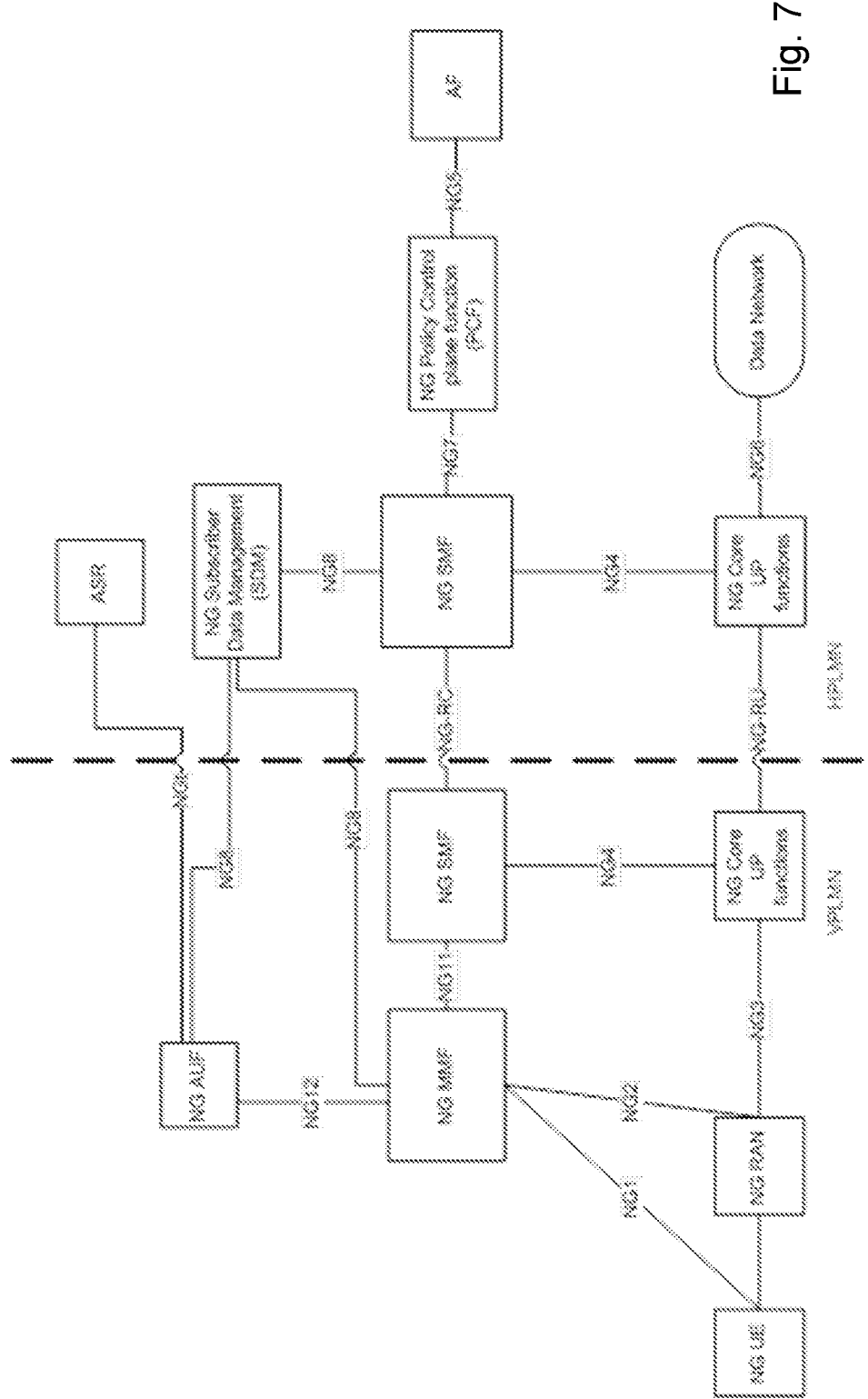
FIG. 7 is a reproduction of Figure 7.6.2-4 from 3GPP TR 23.799v1.0.2.
Figure 8:
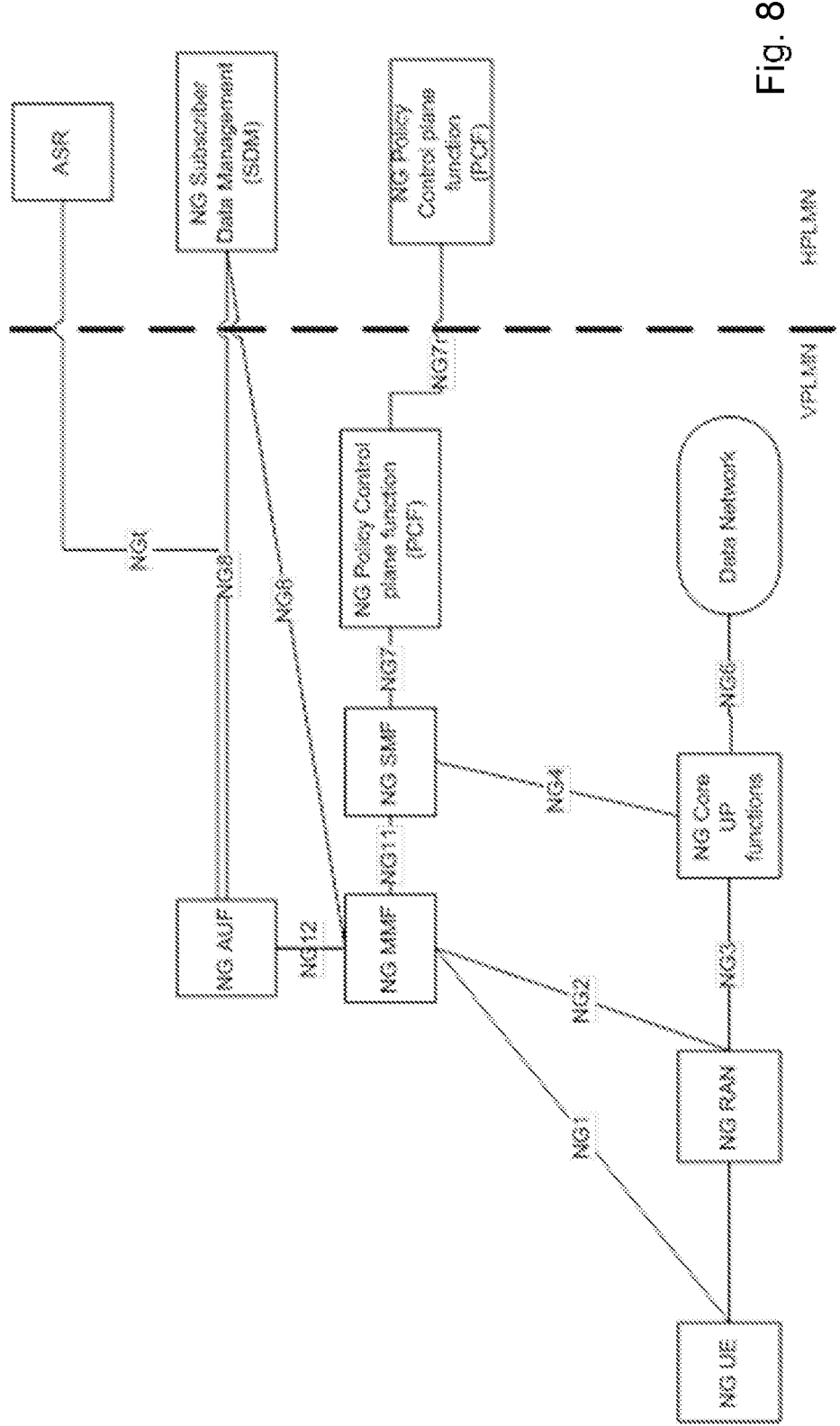
FIG. 8 is a reproduction of Figure 7.6.2-5 from 3GPP TR 23.799v1.0.2.
Figure 9:
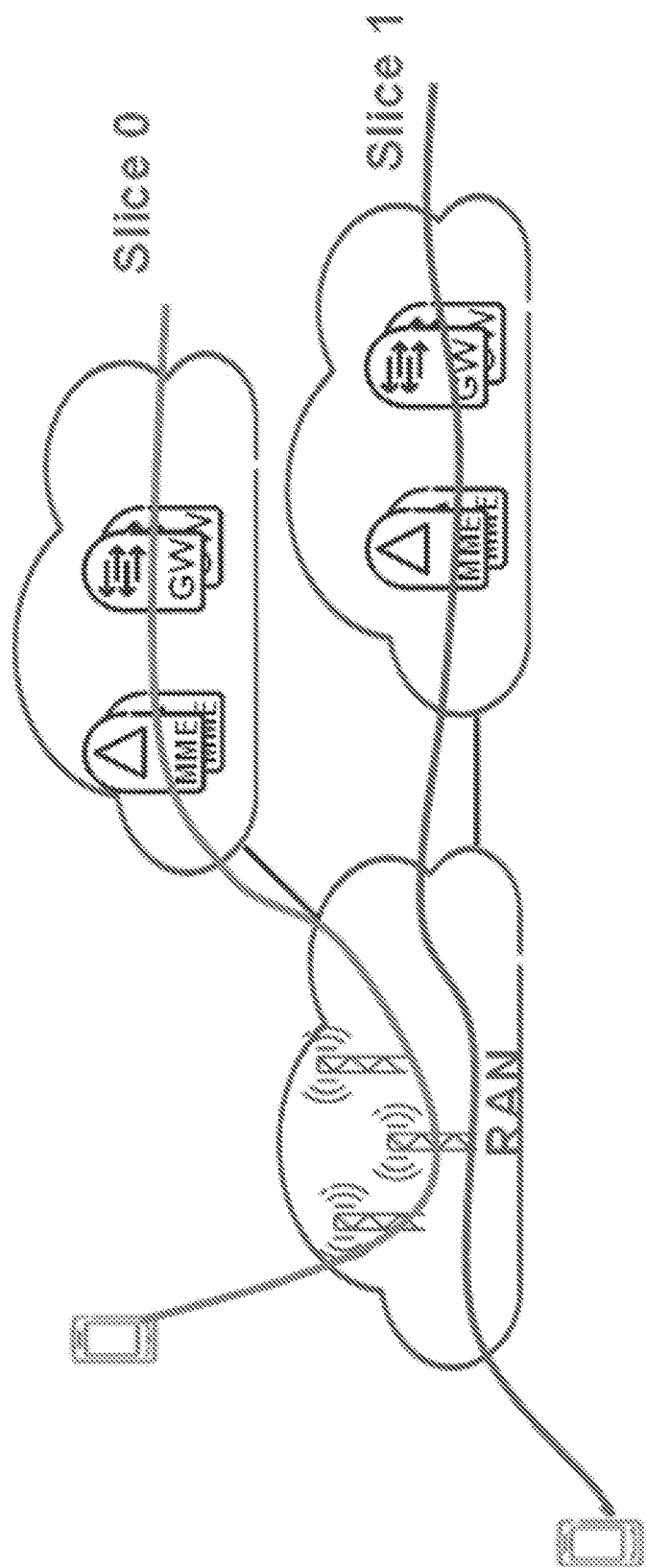
FIG. 9 is a block diagram illustrating example network slices.
Figure 10:
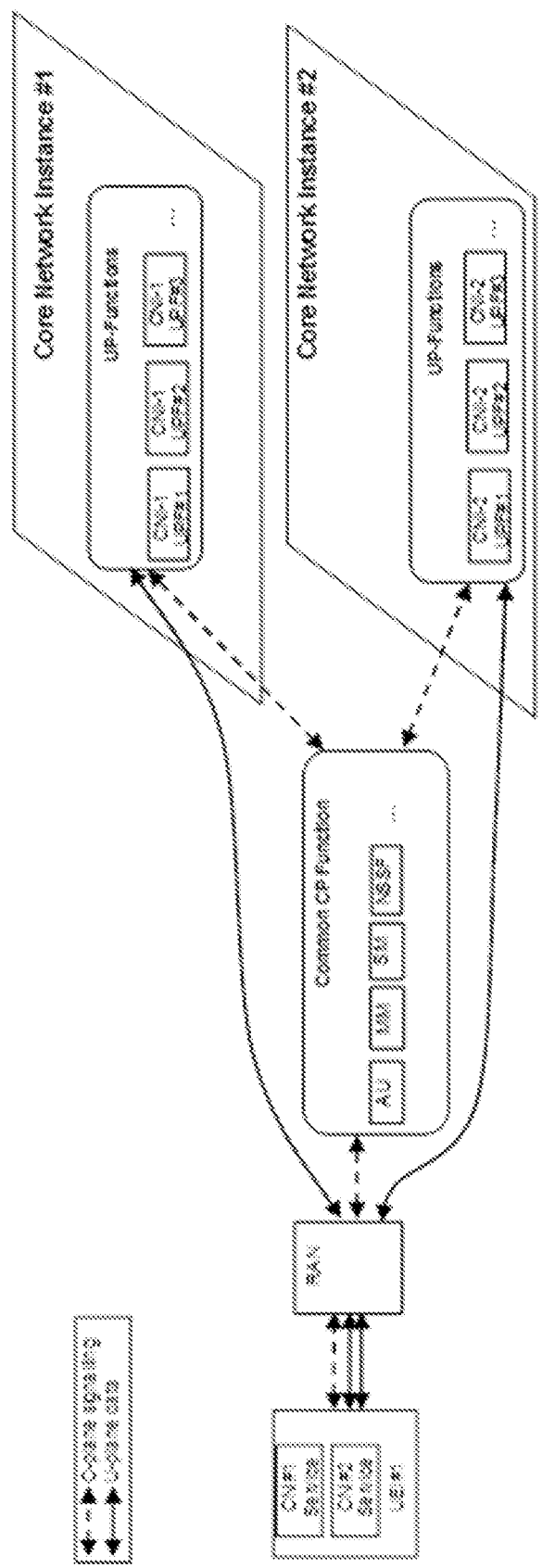
FIG. 10 is a block diagram illustrating a user equipment (UE) connected to multiple slices.

Third Generation Partnership Project (3GPP) networks may include network slicing in long term evolution (LTE)

and 5G new radio (NR) networks. Network slices are logically separated to a degree that they can be regarded and managed as networks of their own. Network slices can be associated with different entities that provide services to the end user via the network slice (e.g., a military or government network providing voice services via a dedicated network slice; a vehicles manufacturer providing vehicle diagnostic services via a dedicated network slice; etc.). A service level agreement (SLA) is commonly associated with a network slice.

One shared radio access network (RAN) infrastructure may connect to several core network (CN) instances. Because the CN functions are virtualized, an operator may instantiate a new CN when a new slice needs to be supported.

Network slicing supports several different virtual networks on the same physical network infrastructure, which may reduce costs and energy consumption. Slicing also facilitates efficient usage of common resources such as radio resources and infrastructure, and transport links between slices, such as fronthaul and backhaul resources.

Network slices also include protection for common channels or resources so that congestion in one slice does not have a negative impact on another slice. While it is understood that the RAN needs to be slice aware, it is not yet understood how that information is disseminated to the relevant entities.

Particular embodiments described herein may include following principles. The CN and RAN exchange information aimed at generating slice awareness. The network assigns a RAN slice identifier (ID) to the CN slice ID explicitly or implicitly (in some embodiments the RAN slice ID and the CN slice ID may be the same, in which case the network slice ID may be referred to as end-to-end (E2E)). The CN Slice ID may be the same as an E2E Slice ID. The RAN Slice ID, however, may be RAN local and point to a RAN specific configuration.

In particular embodiments, the network provides the RAN Slice ID to a user equipment (UE). The UE may present the RAN Slice ID when accessing the network. If the CN Slice ID is an E2E Slice ID then, if provided in the embodiments disclosed below instead of a CN Slice ID, it may identify a specific end-to-end slice, both in the CN and in the RAN.

Certain embodiments disclosed herein enable the RAN to become slice aware enabling the possibility for the UE to indicate slice specific RAN configuration during the connection setup procedure considering the limitation in the size of the messages exchanged over the radio interface.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Particular embodiments are described with reference to FIGS. 11-28B of the drawings, like numerals being used for like and corresponding parts of the various drawings. LTE and NR are used throughout this disclosure as example cellular systems, but the ideas presented herein may apply to other wireless communication systems as well.

Figure 11:
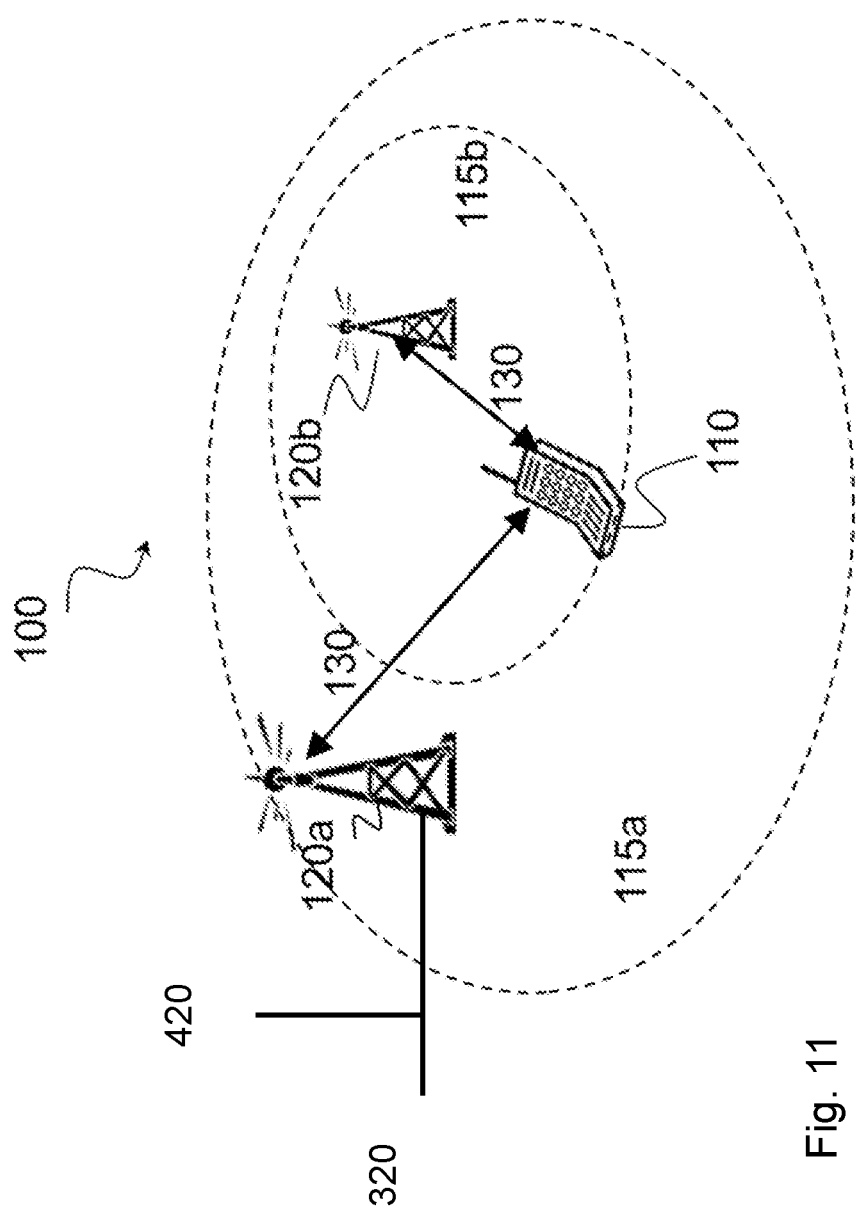
FIG. 11 is a block diagram illustrating an example wireless network, according to a particular embodiment.

FIG. 11 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110.

In some embodiments, wireless device 110 may be referred to by the non-limiting term "UE." A UE may include any type of wireless device capable of communicating with a network node or another UE over radio signals. The UE may comprise radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, network node 120 may include any type of network node such as a base station, radio base station, base transceiver station, base station controller, network controller, evolved Node B (eNB), Node B, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, etc.), or even an external node (e.g., 3rd party node, a node external to the current network), etc.

Wireless signals 130 may include both downlink transmissions (from radio network node 120 to wireless devices 110) and uplink transmissions (from wireless devices 110 to radio network node 120).

Each network node 120 may have a single transmitter or multiple transmitters for transmitting wireless signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120.

Network 100 may include carrier aggregation. For example, wireless device 110 may be served by both network node 120a and 120b and communicate wireless signals 130 with both network node 120a and 120b.

In certain embodiments, network nodes 125 may interface with a radio network controller (RNC). The radio network controller may control network nodes 120 and may provide certain radio resource management functions, mobility management functions, and/or other suitable functions. In certain embodiments, the functions of the radio network controller may be included in network node 120. The radio network controller may interface with a core network node (CN), such as core network node 320.

In certain embodiments, the radio network controller may interface with core network node 320 via an interconnecting wired or wireless network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 320 may manage the establishment of communication sessions and various other functionalities for wireless devices 110. Wireless devices 110 may exchange certain signals with core network node 320 using the non-access stratum layer. In non-access stratum signaling, signals between wireless devices 110 and core network node 320 may be transparently passed through the radio access network. In certain embodiments, network nodes 120 may interface with one or more network nodes 120 over an internode interface, such as, for example, an X2 interface.

Network 100 may include operation and support system (OSS) 420. OSS 420 configures network elements and receives notifications from network elements. A network operator may use OSS 420 to provision network elements with configuration information, such as a node names, IP address information, and any other suitable information.

In some embodiments, the functionality of core network node 320 and/or network node 120 may be virtualized as a network slice. For example, one physical core network node 320 may be configured as one or more virtual CNs. Similarly, one physical network node 120 may support one or more virtual RANs. Core network node 320 and network node 120 may support network slicing as described above in the Introduction.

In some embodiments, core network node 320 is capable of associating two or more network slice identifiers, such as CN slice identifiers and RAN slice identifiers. For example, core network node 320 may obtain a mapping of CN slice identifiers to RAN slice identifiers.

In particular embodiments, core network node 320 obtains the mapping of CN slice identifiers to RAN slice identifiers by receiving the mapping via provisioning from OSS 320. In another embodiment, core network node 320 obtains the mapping of CN slice identifiers to RAN slice identifiers by receiving a setup request (e.g., S1 Setup Request) from network node 120. Core network node 320 sends a setup response (e.g., S1 Setup Response) that includes a CN slice identifier back to network node 120. Core network node 320 may then receive a configuration update (e.g., S1AP) from network node 120 that includes the mapping of CN slice identifiers to RAN slice identifiers.

In another embodiment, core network node 320 obtains the mapping of CN slice identifiers to RAN slice identifiers by receiving a setup request (e.g., S1 Setup Request) from network node 120, where the setup request includes one or more RAN slice identifiers. Core network node 320 may map the RAN slice identifiers to CN slice identifiers.

After obtaining the mapping, core network node 320 may use the mapping when handling request from wireless device 110. For example, core network node 320 may receive a slice registration request from wireless device 110. In particular embodiments, the slice registration request may include a CN slice identifier. Core network node 320 determines a slice identifier associated with the slice registration request. If the slice registration request included a CN slice identifier, core network node 320 may determine a RAN slice identifier associated with the CN slice identifier. Otherwise, core network node 320 may first inspect subscriber information associated with wireless device 110 to determine a CN slice identifier associated with the slice registration request. Then core network node 320 may determine a RAN slice identifier associated with the CN slice identifier.

In particular embodiments, core network node 320 sends a slice registration response to wireless device 110. The slice registration response includes the determined slice identifier. The slice identifier may comprise a local slice identifier relative to wireless device 110, or a temporary or dedicated identifier of core network node 320. The slice registration response may include one or more services associated with the slice identifier.

In particular embodiments, the slice registration request and the slice registration response comprise NAS messages. In some embodiments, the slice registration response comprises an AS message.

According to some embodiments, network node 120 is capable of associating network slice identifiers. Network node 120 obtains a mapping of CN slice identifiers to RAN slice identifiers. In some embodiments, network node 120 receives the mapping via provisioning from OSS 420. In some embodiments, network node 120 sends a setup request (e.g., S1 Setup Request) to core network node 320. The setup request includes one or more RAN slice identifiers. Network node 120 may receive a setup response (e.g., S1 Setup Response) from core network node 320. The setup response includes the mapping of CN slice identifiers to RAN slice identifiers.

In particular embodiments, network node 120 receives a slice registration response from core network node 320. For example, when the slice registration response is an AS message, network node 120 has visibility into the response from core network node 320 to wireless device 110. In this scenario, network node 120 (instead of core network node 320) may perform the mapping of CN slide ID to RAN slice ID. For example, the slice registration response may include a CN slice identifier. Network node 120 may determine a RAN slice identifier using the CN slice identifier and the previously obtained mapping of CN slice identifiers to RAN slice identifiers. Then network node 120 sends the determined RAN slice identifier to wireless device 110 (e.g., sends an access AS message to wireless device 110).

In particular embodiments, network node 120 may determine one or more RAN slice identifiers associated with a wireless device 110, and map each of the RAN slice identifiers to a local slice identifier relative to wireless device 110. For example, instead of using long global identifiers, network node 120 may convert the long global identifiers to shorter local identifiers. The local identifiers uniquely identify a network slice to the particular wireless device 110. Network node 120 may send the one or more local slice identifiers to wireless device 110. The local identifiers save space when later when used in signaling messages from wireless device 110.

In particular embodiments, network node 120 may receive a connection request from wireless device 110. The connection request may include a local slice identifier. Network node 120 determines a RAN slice identifier based on the local slice identifier in the connection request, and applies a policy of a network slice associated with the determined RAN slice identifier to the requested connection. In other embodiments, the connection request may include at least one of a RAN slice identifier, a CN slice identifier, a temporary core network node identifier, a dedicated core network node identifier, and a service identifier.

According to some embodiments, wireless device 110 associates a wireless connection with a network slice. Wireless device 110 sends a slice registration request to core network node 320, and receives a slice registration response from core network node 320. The slice registration response includes a slice identifier. The slice registration request may include a CN slice identifier. The slice identifier in the response may include at least one of a RAN slice identifier, a CN slice identifier, a local slice identifier relative to the UE, a temporary core network node identifier, a dedicated core network node identifier, and a service identifier.

In particular embodiments, the slice registration request and the slice registration response both comprise a NAS messages. In some embodiments, the slice registration response comprises an AS message.

In particular embodiments, wireless device 110 may send a connection request to network node 120. The connection request includes at least one of a RAN slice identifier, a CN slice identifier, a local slice identifier relative to the UE, a temporary core network node identifier, a dedicated core network node identifier, and a service identifier. In some embodiments, wireless device 110 sends a connection request that includes a network slice class identifier. Signaling of network slice identifiers is described in more detail below with respect to FIGS. 12-25.

In wireless network 100, each radio network node 120 may use any suitable radio access technology, such as long term evolution (LTE), LTE-Advanced, NR, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described below with respect to FIG. 26A. Similarly, a network node may include any suitable combination of hardware and/or software. For example, in particular embodiments, a network node, such as network node 120, may include the components described below with respect to FIG. 27A. A core network node may include any suitable combination of hardware and/or software. For example, in particular embodiments, a core network node, such as core network node 320, may include the components described below with respect to FIG. 28A.

Particular embodiments include network RAN slice ID assignment. Two groups of embodiments may be used to associate a RAN Slice ID to the CN Slice ID (or alternatively the CN Slice ID to the RAN Slice ID).

A first group of embodiments include RAN/CN procedure based association. A pre-requisite for these embodiments is that the network node (e.g., eNB, gNB, etc.) is configured with a RAN Slice ID to CN Slice ID mapping. An example is illustrated in FIG. 12.

Figure 12:
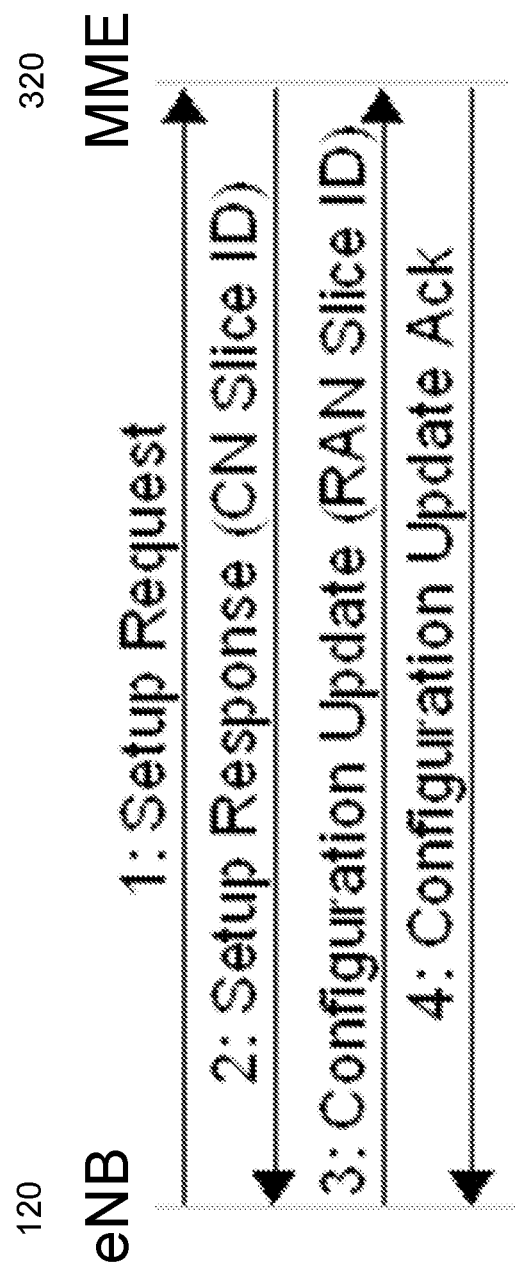
FIG. 12 is a sequence diagram illustrating an example of configuring a RAN slice ID in the core network (CN), according to some embodiments.

FIG. 12 is a sequence diagram illustrating an example of configuring a RAN slice ID in the core network (CN), according to some embodiments. The sequence diagram includes a network node 120 (i.e., eNB 120) and a core network node 320 (e.g., mobility management entity 320).

At step 1, eNB 120 sends a Setup Request message initiating setup of, for example, the S1 interface (see 3GPP TS 36.413). At step 2, MME 320 sends a Setup Response message (see 3GPP TS 36.413). The Setup Response message includes CN Slice ID information. At step 3, eNB 120 sends a S1AP message that includes the RAN Slice ID information associated with the CN Slice ID information received in step 2. In some embodiments, the RAN Slice ID information may be configured in eNB 120 by O&M (e.g., from OSS 420). At step 4, MME 320 may acknowledge the configuration update. Particular embodiments may include more or fewer steps.

For example, in some embodiments the S1: SETUP REQUEST includes a list of slice IDs supported by the RAN and known to the RAN by means of configuration. Upon reception of the list of RAN slice IDs, the CN may respond with an S1: SETUP RESPONSE that includes a list of CN slice IDs mapped to the received RAN Slice IDs. This informs the CN which CN slice ID is mapped to each RAN slice ID.

In another embodiment, the RAN generates an S1: SETUP REQUEST towards one or more CN nodes. Each CN node receiving this message responds with a S1: SETUP RESPONSE with a list of slice IDs included. The list is the list of slice IDs for the network slices supported by each CN node. With this information the RAN can build a mapping of slice ID and CN node supporting the network slice corresponding to the slice ID.

In another embodiment, the CN provides a list of CN IDs and, for each CN ID, one or more CN slice IDs supported by the CN. The CN IDs may be used later by a UE in RRC messages and the RAN may use the CN ID to identify which network slice policies to apply for the UE access. Particular embodiments facilitate a CN entity to support one or more slices for a UE access, and different slice combinations for different UE accesses. This principle can be used for the CN MMF (Mobility Management Function) which can be common to multiple network slices for a UE. The CN ID may correspond to the DCN-ID or GUTI in EPS.

A second group of embodiments include configuration based assignment. For example, in particular embodiments the CN is configured by O&M (e.g., from OSS 420) with a CN Slice ID to RAN Slice ID mapping. The RAN may be configured with the same mapping.

Some embodiments include configuring a UE with a RAN slice ID. Two groups of embodiments are described below. A first group of embodiments includes non-access stratum (NAS) embodiments. Particular embodiments provide a UE the RAN slice ID associated with a CN slide ID using NAS signaling. An example is illustrated in FIG. 13.

Figure 13:
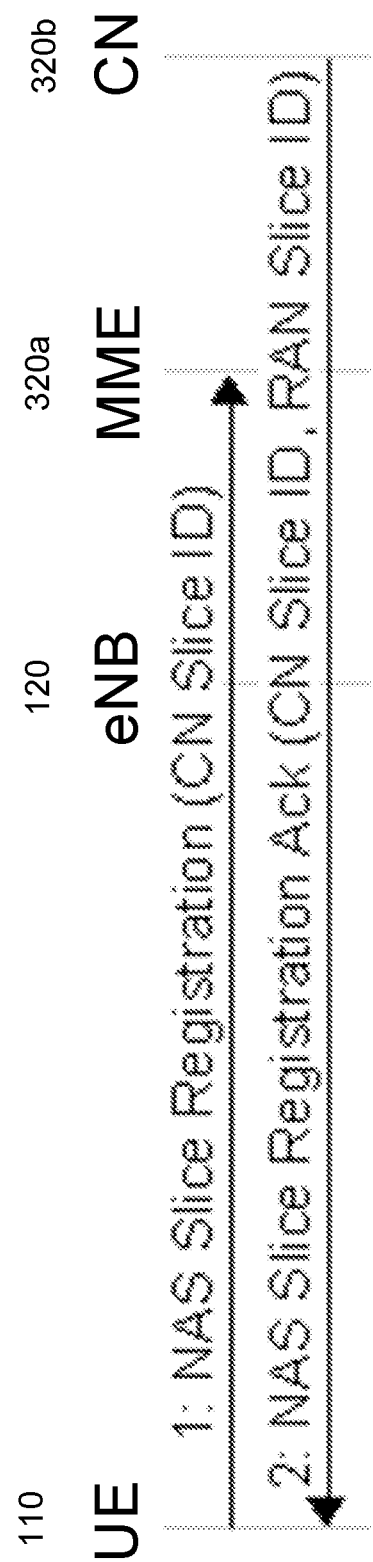
FIG. 13 is a sequence diagram illustrating an example of NAS-based UE configuration, according to some embodiments.

FIG. 13 is a sequence diagram illustrating an example of NAS-based UE configuration, according to some embodiments. The sequence diagram includes wireless device 110 (i.e., UE 110), network node 120 (i.e., eNB 120) and core network nodes 320 (i.e., mobility management entity 320a and CN 320b).

At step 1, UE 110 requests a registration with a slice indicating the CN Slice ID in a NAS message to the CN. At step 2, the CN is already configured with the CN Slice ID and the related RAN Slice ID mapping as described in the previous embodiments. The CN includes the CN Slice ID and the associated RAN Slice ID in the NAS response message. Particular embodiments may include more or fewer steps.

For example, in some embodiments the UE may perform a NAS service request without indicating any slice ID. The CN may (e.g., by inspecting the UE subscriber's information) be deduced by which network slice the UE service request applies to. This results in the CN indicating to the UE which RAN slice ID it should use in communication with the RAN.

In another embodiment, the UE may receive from the CN (e.g., via NAS signaling) a full configuration mapping CN slice IDs, RAN slice IDs and services per slice tenant. This configuration enables the UE to provide the opportune slice ID, whether to the RAN or to the CN or both, in appropriate signaling at the time of starting procedures to enable a service hosted by a given network slice.

In another embodiment, the CN may provide the UE with a CN ID which the UE shall use in RRC messages for RAN to identify CN entity to route to as well as identify the RAN slice(s) that the access attempt relates to and for the RAN to apply corresponding slice policies. The CN ID may be a temporary ID (as S-TMSI in EPS), or CN Slice ID or DCN-ID (as used to identify dedicated CN in EPS).

In another embodiment, the CN may provide a list of APNs (or similar such as DNN described in TR 23.799) supported for the UE (i.e., list of subscribed APNs/DNNs) and for each APN the Slice ID to use in network signaling (RAN slice ID and CN slice ID). The UE associates application/services to APN, and thereby knows which slice ID(s) to use for each application/service.

In FIG. 13 an MME and a CN node are shown as involved in the NAS signaling with the UE. These two nodes may be the same node or two different nodes.

A second group of embodiments includes access stratum (AS) embodiments. In these embodiments, the CN includes the CN slice ID outside the NAS message (response to the NAS Slice registration Request message) in the S1AP message. The eNB looks up its configuration of the CN slice ID to RAN slice ID and provides the mapped RAN slice ID to the UE in the Access Stratum (e.g., RRC) message that carries the NAS Slice Registration Response message. An example is illustrated in FIG. 14.

Figure 14:
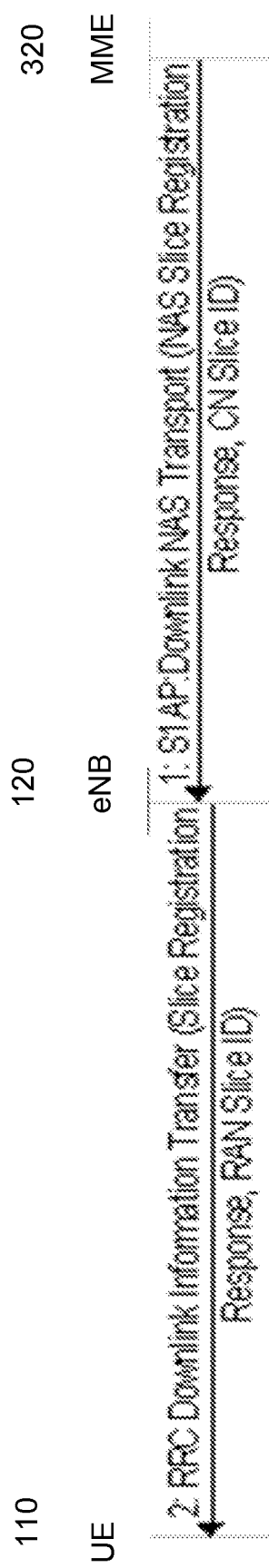
FIG. 14 is a sequence diagram illustrating an example of AS-based UE configuration, according to some embodiments.

FIG. 14 is a sequence diagram illustrating an example of AS-based UE configuration, according to some embodiments. The sequence diagram includes wireless device 110 (i.e., UE 110), network node 120 (i.e., eNB 120) and core network node 320 (i.e., mobility management entity 320).

At step 1, after receiving an initial NAS signaling from UE 110 to request a service within a given network slice, MME 320 sends a S1AP Downlink NAS Transport message containing the NAS Slice Registration Response message and CN slice ID to eNB 120.

At step 2, based on its configuration, eNB 120 determines the RAN slice ID associated with the CN slice ID received in step 1. The eNB includes the determined RAN slice ID in the RRC Downlink Information Transfer message. UE 110 stores the received RAN slice ID and associates it with the CN slice ID that it has registered with by means of that procedure. An advantage of the AS embodiments is that the network node has visibility into the response to the UE.

In another embodiment, the UE starts by sending a NAS service request that does not include a slice ID. The UE will receive from the MME via the DL NAS Transfer and RRC Downlink Information Transfer information that includes a mapping between the requested service and the RAN slice ID mapping to the network slice hosting the service.

In another embodiment of this method the UE will receive via similar signaling mechanisms a list of all slice IDs the UE may be able to access. This can be provided via RRC signaling and it can take one of the following forms: (a) mapping between the CN slice IDs and RAN slice IDs for the network slices the UE can access; or (b) mapping between CN slice IDs, RAN slice IDs and service types for the network slices the UE can access.

Additional embodiments include signaling mechanisms. For example, particular embodiments solve the problem of how to let the RAN know as soon as possible which network slice the UE is trying to access. This is important to let the RAN retrieve the right resource and service policies for the UE accessing the slice. Particular embodiments assume that the UE has received information (e.g., in the form of a configuration) about how to apply a slice identifier when requesting RRC connection establishment or resume for a given service or set of services.

In particular embodiments, the UE may present a RAN slice identifier at Msg3 (i.e., at RRC Connection Request or RRC Connection Resume Request). Alternatively, the UE may present the RAN slice ID at any message sent over the air to the RAN during radio access or following a successful access (e.g., RAN slice ID may be provided at first radio access message). The representation of the RAN slice ID can be also realized by partitioning of the resources used during the access procedure (e.g., preambles). The partitioning may be provided to the UE either in dedicated or common signaling.

In some embodiments, the RAN slice identifier provided in the RRC Connection Request or RRC Connection Resume Request is not a unique slice identifier within the RAN but it is a slice identifier within the UE context created at the RAN. The method is based on the assumption that a UE context has previously been created at the RAN and that the context includes information about the RAN and CN slice IDs the UE can access.

The UE Context can be stored in RAN or be part of the UE's Context in the CN. For example, the UE may be able to access 5 network slices, corresponding to 5 RAN and CN slice IDs. However, these network slices are numbered, within the UE context, slice 1 to 5. The information on the mapping between local slice IDs and slices the UE can access is also provided to the UE.

When the UE provides a RAN slice identifier in one of the messages sent during radio access (e.g., the RRC Connection Request or RRC Connection Resume Request) the UE may indicate one of identifiers 1 to 5. This will suffice to identify one of the network slices the UE is allowed to access. This mechanism saves signaling bits over the air because the field the UE signals to indicate the slice requested is relatively small and it only covers the number of slices the UE can access.

On the other hand, the field would be much larger if the UE had to signal a global slice identifier within a large range of IDs. For example, to indicate a slice identifier within a range of 1 to 126 IDs the UE needs to signal an 8 bit long field. To indicate a slice identifier within a range of 1 to 5, the UE only needs to signal a 3 bits field.

In another embodiment, the UE may provide in RRC Connection Request or RRC Connection Resume Request a generic identifier that points at a network slice class. The generic identifier may enable the RAN to apply generic policies for all network slices in a certain class, such policies applying to the UE access phase (e.g., the policies may define how resources should be allocated to the UE during initial signaling phases of radio access).

The reason why such a less granular identifier may be provided by the UE is because of bit limitations in the messages used to request radio access, such as RRC Connection Request or RRC Connection Resume Request, namely to the challenge of providing more extra bits in such messages. After providing such a generic identifier the UE may, at the next message to the RAN (e.g., RRC Connection Setup Complete) provide a more accurate identifier for the slice the UE is requesting to access. The latter identifier enables the RAN to retrieve the full set of policies for the UE and for the services it is requesting to access over the network slice. The two embodiments described above are represented by FIGS. 15 and 16.

Figure 15:
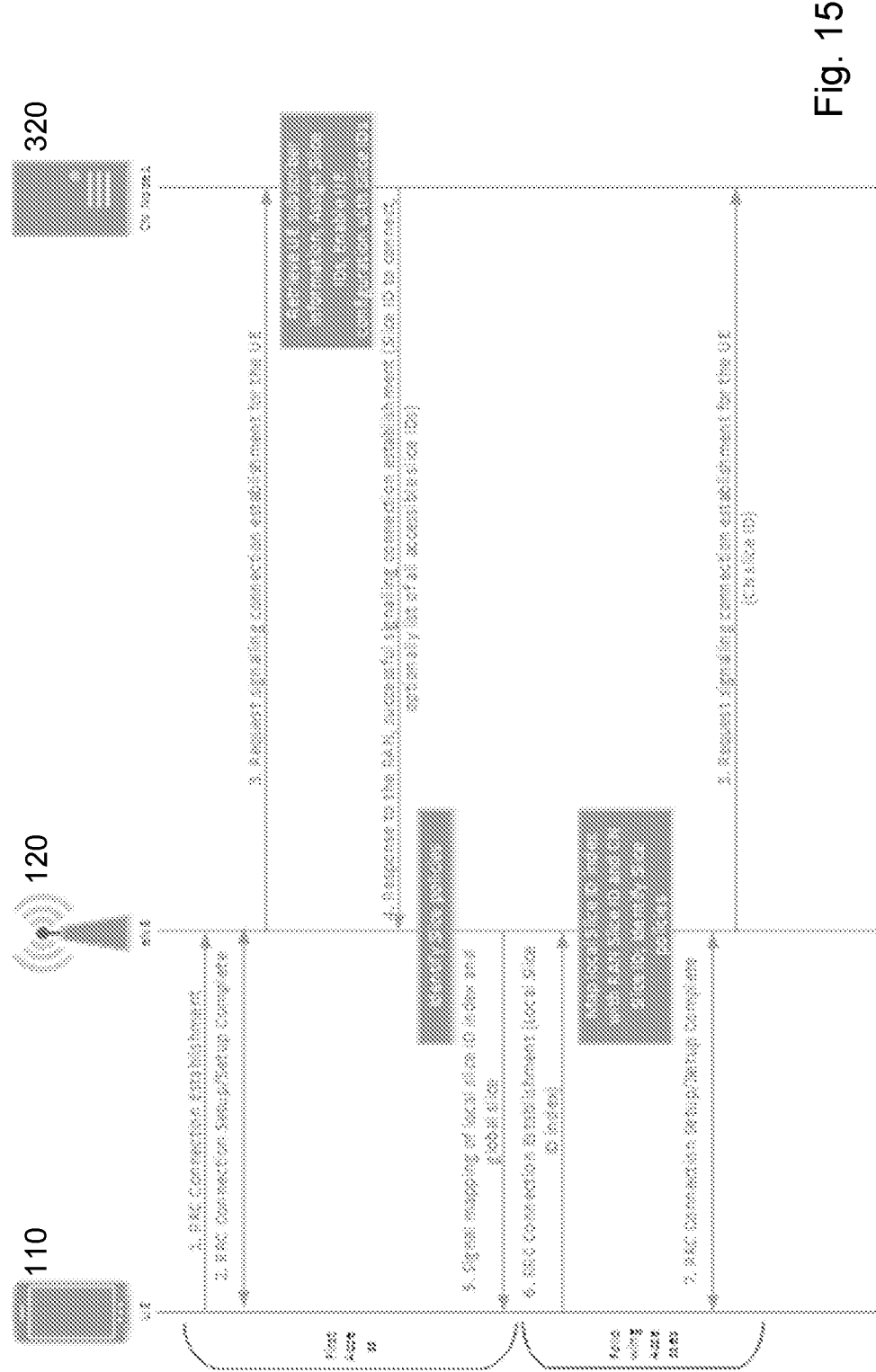
FIG. 15 is a sequence diagram illustrating an example of a UE using a local slice ID, according to some embodiments.

FIG. 15 is a sequence diagram illustrating an example of a UE using a local slice ID, according to some embodiments. The example includes wireless device 110 (i.e., UE 110), network node 120 (e.g., eNB 120) and core network node 320 (i.e., CN Node 1).

In the illustrated example, UE 110 at its first access is not configured with any slice ID. Note that in some embodiments this may not be the case and UE 110 may be configured with global RAN slice IDs, which UE 110 may provide to the RAN (e.g., eNB 120) in one of the radio accesses messages.

The RAN starts setup of a signaling connection for UE 110 with the CN (Message3). The CN (e.g., core network node 320) checks the UE subscriber's information and service request and decides to which network slice UE 110 shall connect. The CN responds to the RAN with a message that establishes the signaling connection for UE 110 and that may inform the RAN of either the network slice UE 110 needs to be associated to, or with such network slice information plus a list of all network slices UE 110 can access. Information from CN to RAN (Message4) on network slices UE 110 can access may be provided in the form of CN slice IDs, RAN slice IDs, or both.

In message 5 the RAN signals to UE 110 a mapping between the global slice identifiers for the slices UE 110 can access and the local slice identifier relative to the UE context.

After this point UE 110, upon performing a radio access procedure, signals (Message7) to the RAN the local slice identifier, which the RAN is able to map to a global RAN slice ID and CN slice ID. The RAN may indicate the selected slice to the CN as per Message 8.

Figure 16:
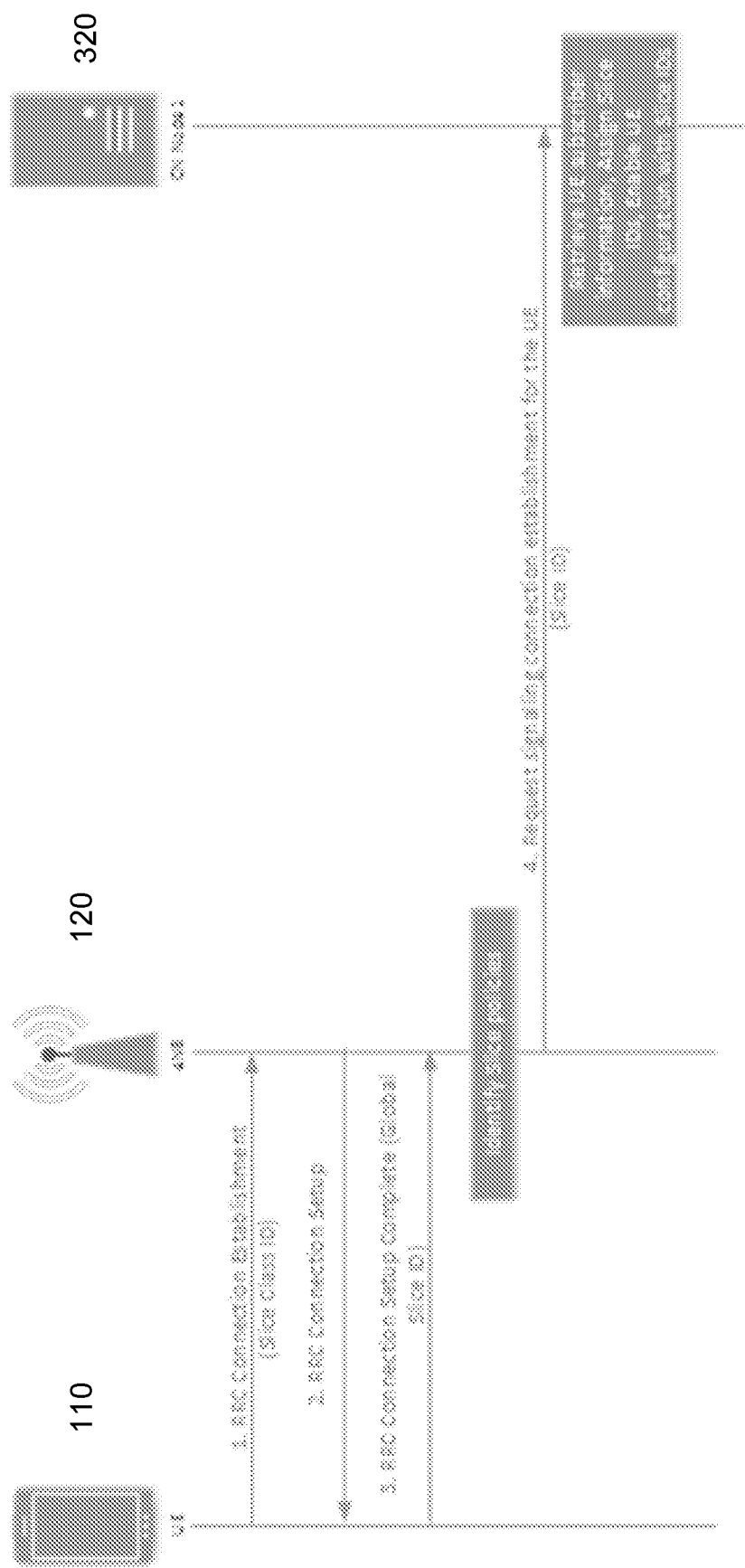
FIG. 16 is a sequence diagram illustrating an example of a UE using a slice class ID, according to some embodiments.

FIG. 16 is a sequence diagram illustrating an example of a UE using a slice class ID, according to some embodiments. The example includes wireless device 110 (i.e., UE 110), network node 120 (e.g., eNB 120) and core network node 320 (i.e., CN Node 1).

In the illustrated example, it is assumed that UE 110 has been configured with information about the slice class ID (i.e., a generic slice ID) for each slice that it can access, as well as with information about the global slice IDs (e.g., RAN Slice IDs) of slices that it can access.

The UE provides a first generic slice class ID in one of the first messages for the radio access, as in the example in Message 1. At a later phase, the UE may provide a global slice ID (e.g., the RAN slice ID as part of Message 3.

Some embodiments may include the option of using DCN-ID and PDU Session Ids as slice IDs. Examples are illustrated in FIGS. 17 and 18.

Figure 17:
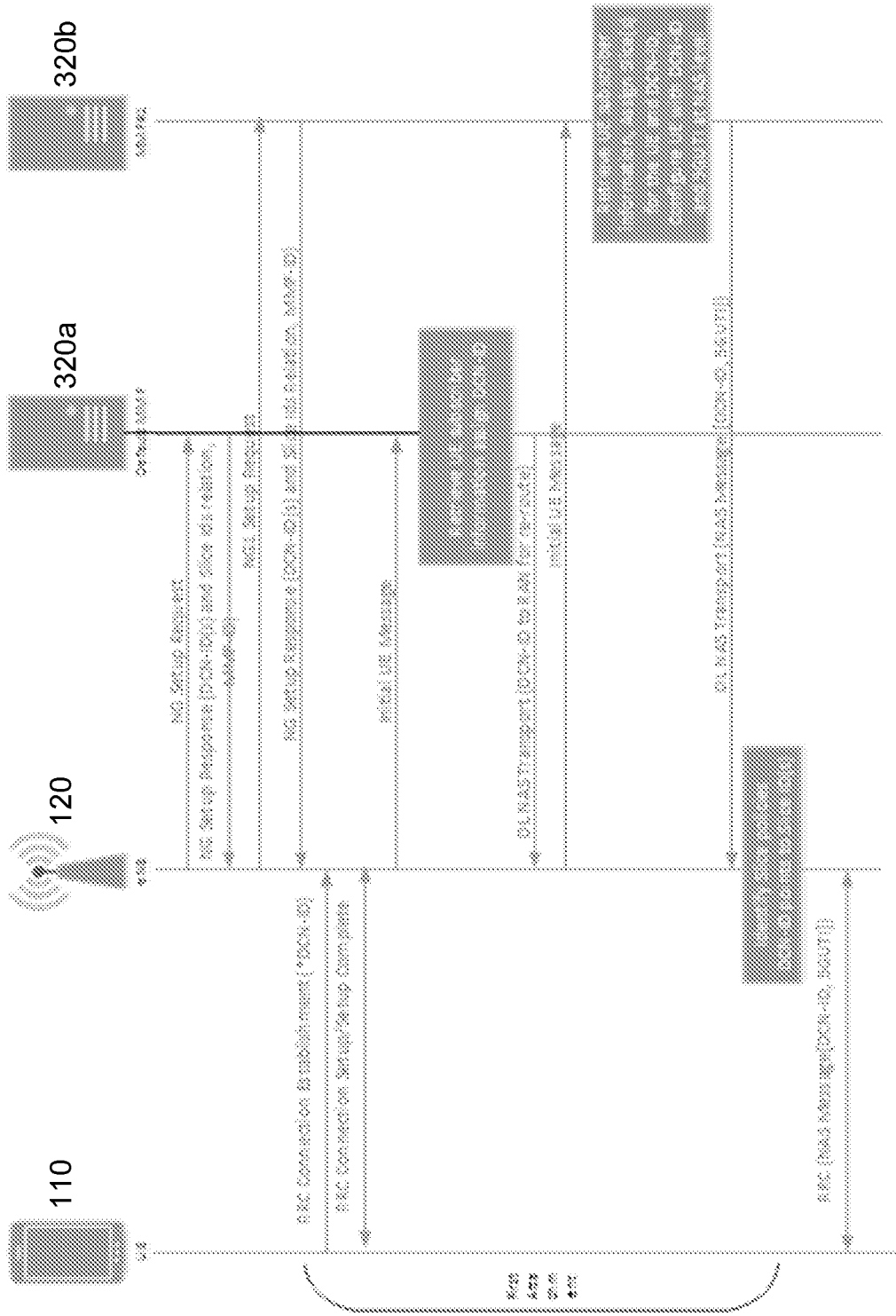
FIG. 17 is a sequence diagram illustrating an example of using an alternative slice ID during a first attach, according to some embodiments.
Figure 18:
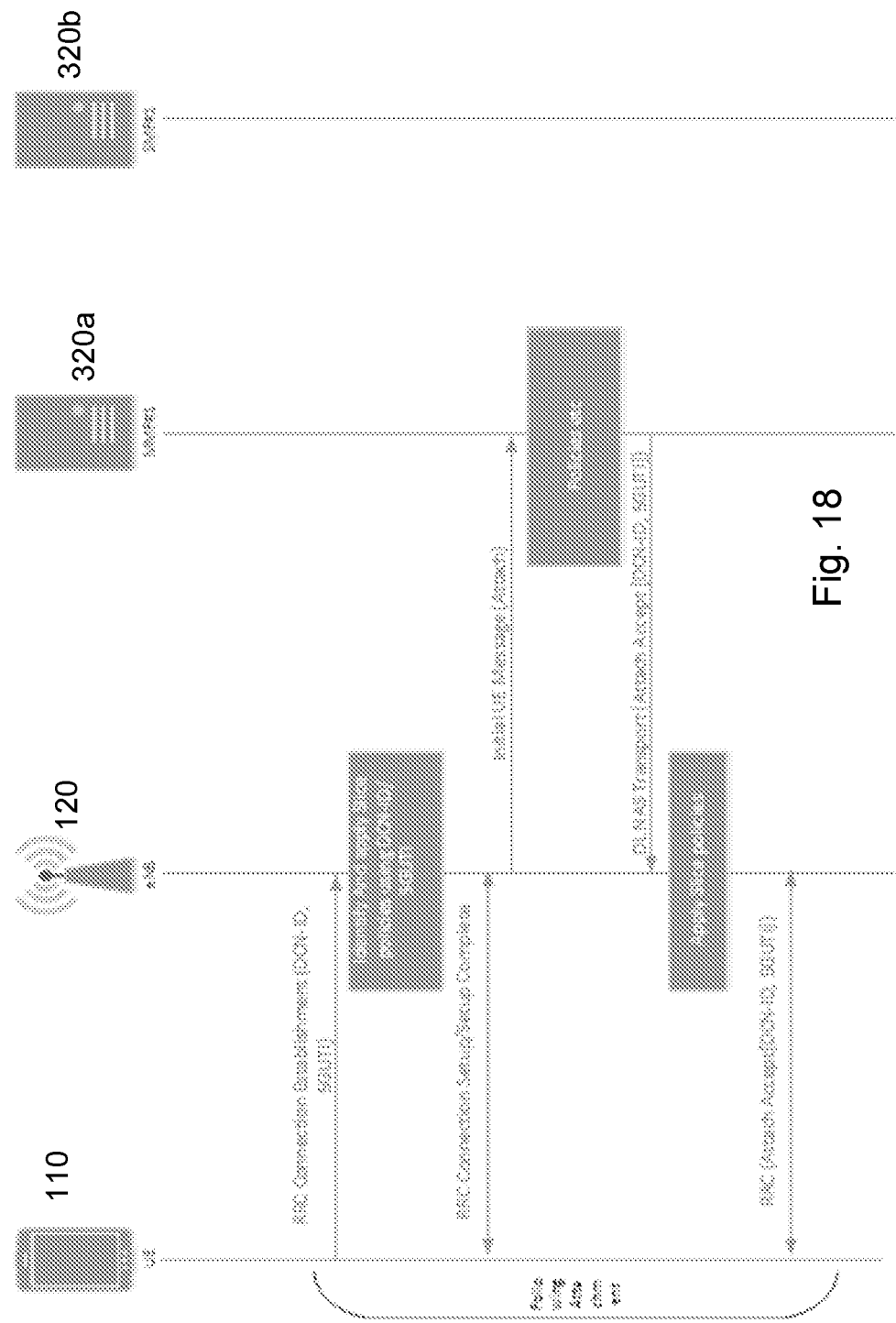
FIG. 18 is a sequence diagram illustrating an example of using an alternative slice ID after a first attach, according to some embodiments.
Figure 19:
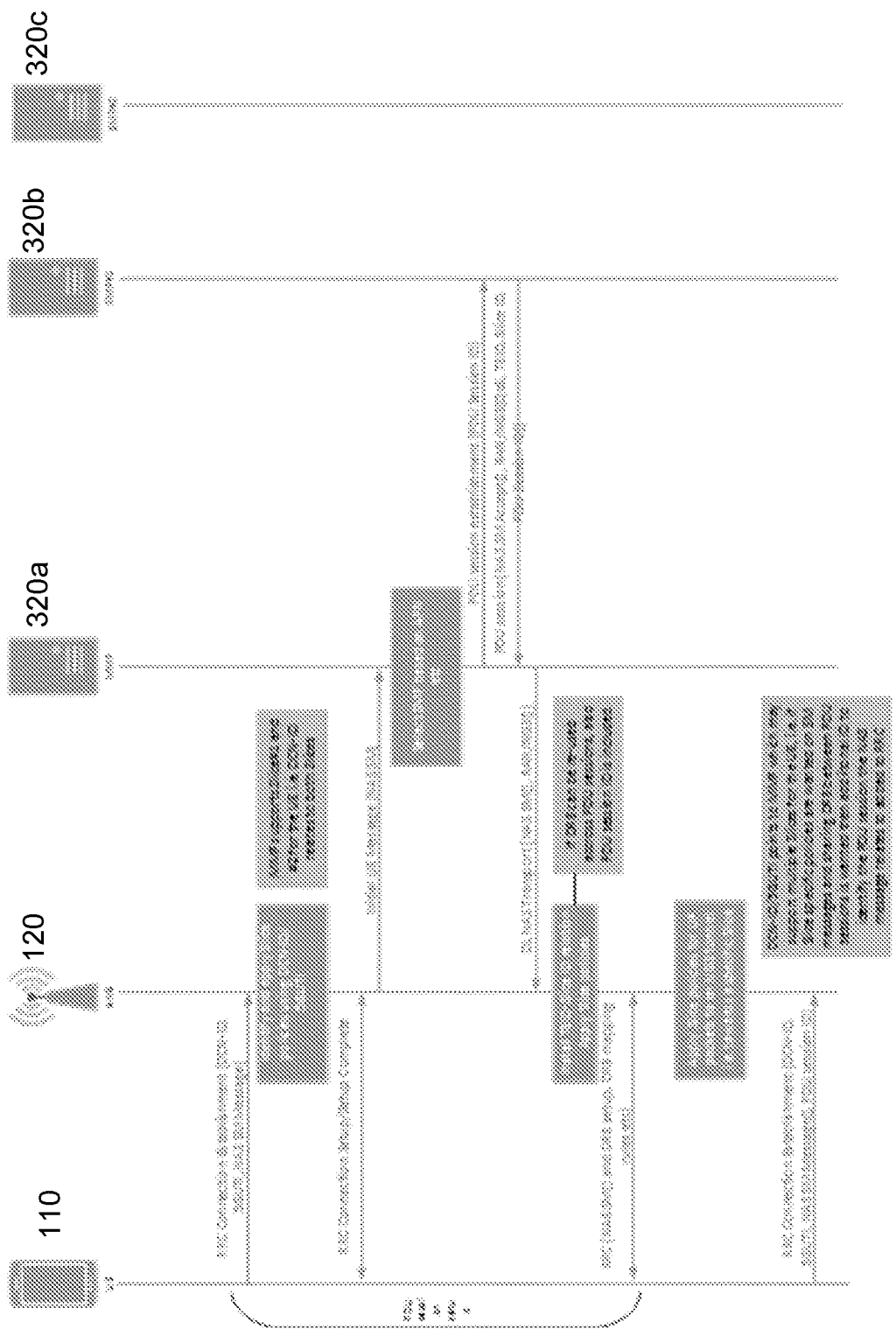
FIGS. 19-22 are sequence diagrams illustrating use of a session ID for associating a network slice, according to some embodiments.
Figure 20:
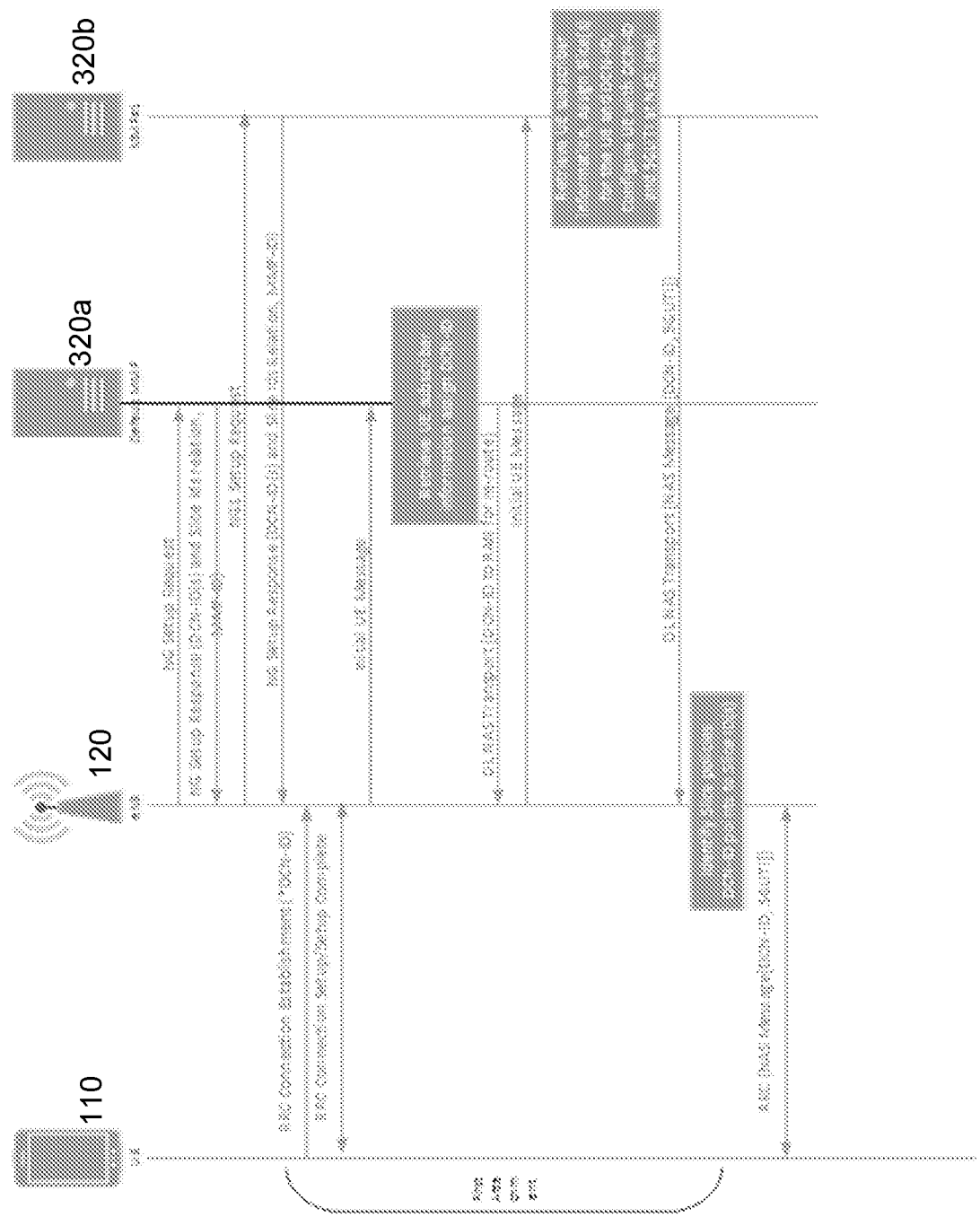
Figure 21:
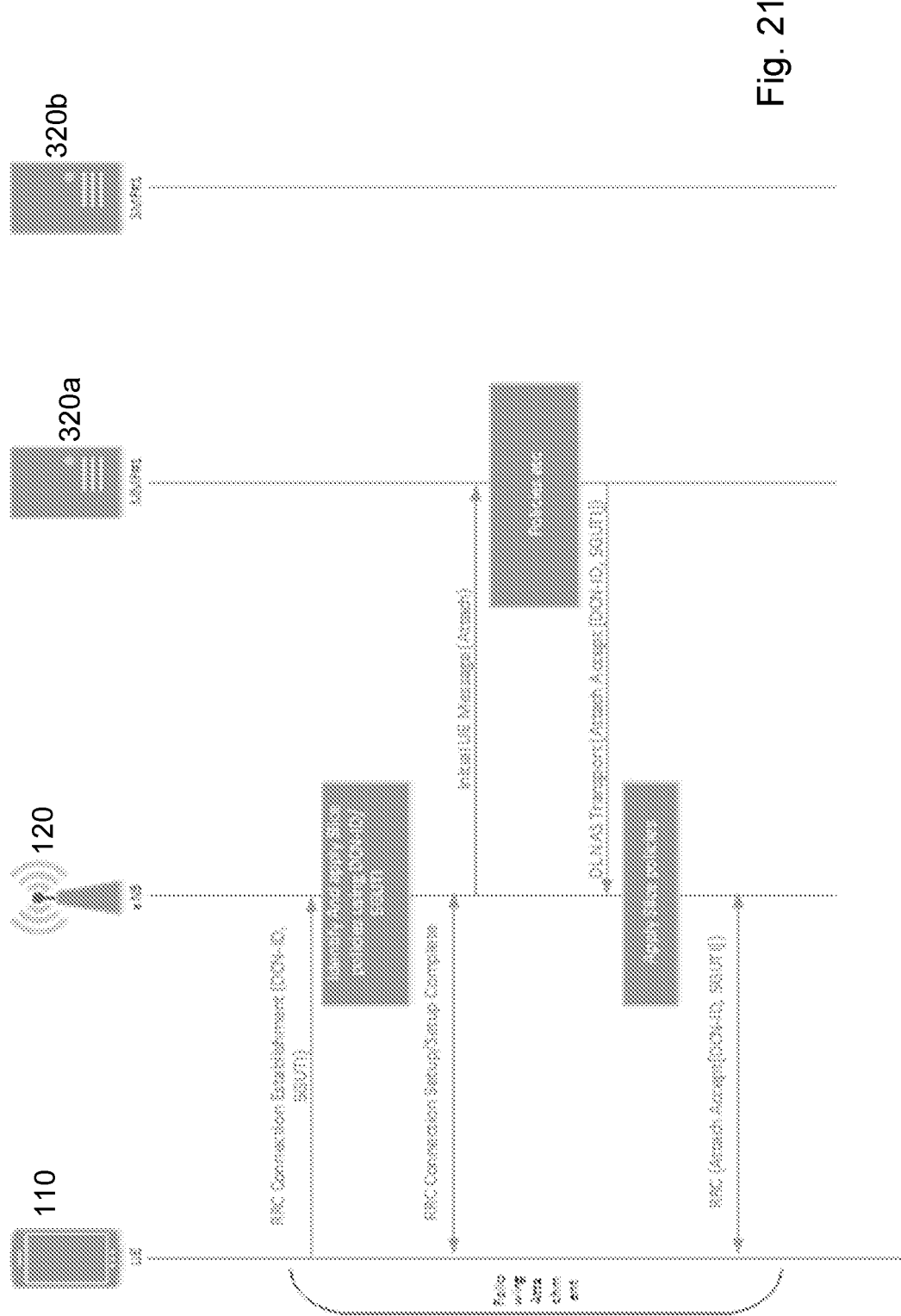
Figure 22:
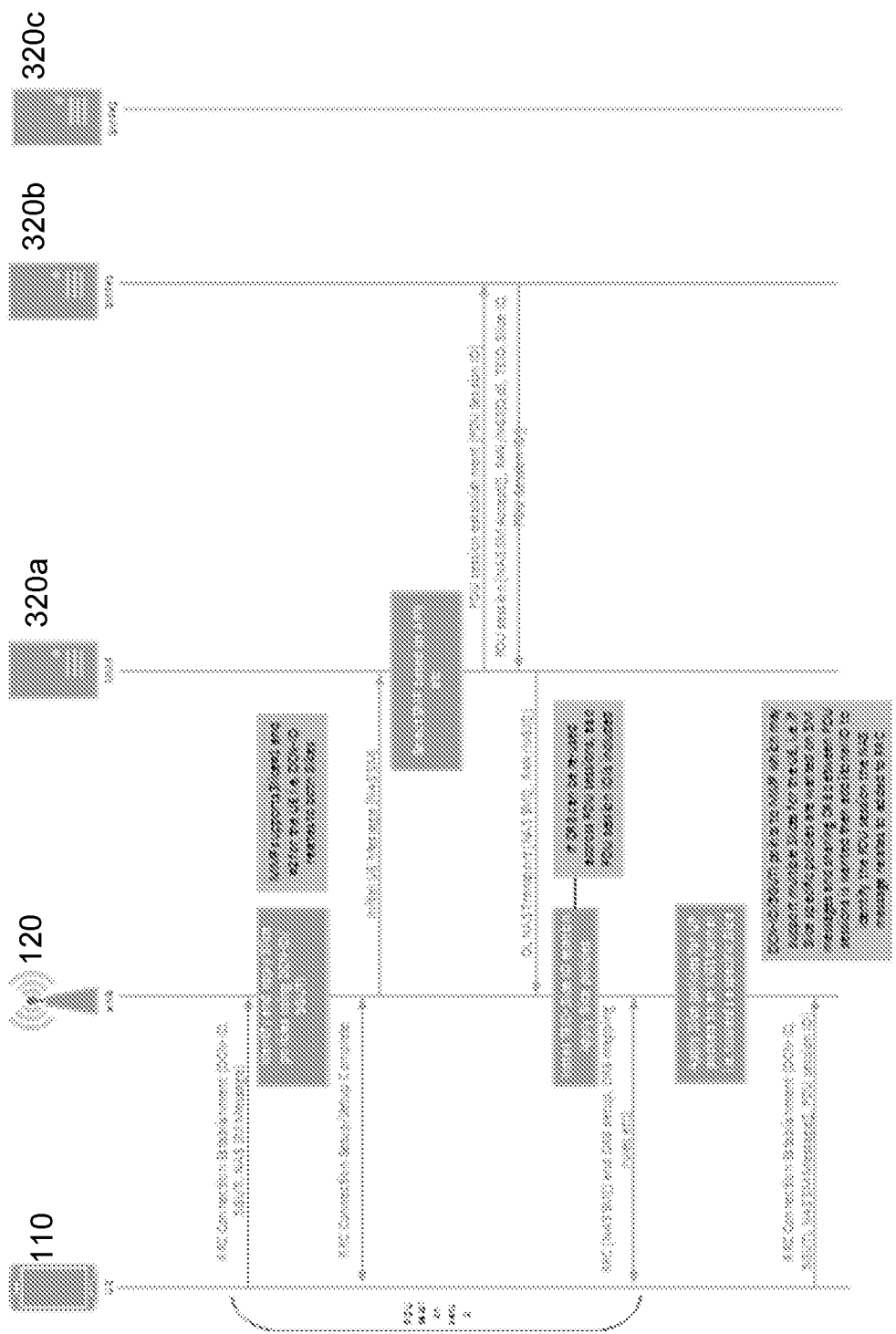

FIG. 17 is a sequence diagram illustrating an example of using an alternative slice ID during a first attach, according to some embodiments. The example includes wireless device 110 (i.e., UE 110), network node 120 (e.g., eNB 120) and core network nodes 320 (i.e., Default MMF 320a and MMF#1 320b).

In the illustrated example, the RAN and CN (MMF) configuration using e.g., NG Setup procedure configures the relation between the CN/MMF identities and the Network Slices supported for those identities. In some embodiments the MMF may support one network slice and in other embodiments the MMF may support more than one network slice.

Different DCN-IDs (which contain the MMF ID) may be provided to support different scenarios (e.g., for one UE a MMF supports one network slice and for another UE the MMF supports another or more network slices). The different scenarios can also be supported by different MMF identities, but that may require more NG Setup procedures.

When UE 110 first is attached/registered to the network, UE 110 may provide a standardized DCN-ID or no DCN-ID. The RAN uses the DCN-ID and possibly other information to select an MMF to serve UE 110. If no information available, a default MMF is selected. The MMF retrieves subscriber information and decides which MMF should serve the UE. In the illustrated example, a re-route is done to MMF#1 via the RAN.

The MMF#1 retrieves subscriber information and performs, for example, authentication, etc. The MMF#1 provides to UE 110 the DCN-ID and temporary ID (5GUTI) to use in subsequent messages in the PLMN.

The RAN is also provided with the identities so that the RAN may apply, for example, slice specific RRM policies. The UE stores the identities received and may use them in subsequent communication with the network in the PLMN.

FIG. 18 is a sequence diagram illustrating an example of using an alternative slice ID after a first attach, according to some embodiments. In the illustrated example, UE 110 provides the stored DCN-ID and 5GUTI. The RAN identifies (e.g., using DCN-ID and/or 5GUTI) and applies slice specific policies for the RRC connection. The CN may update the DCN-ID and/or 5GUTI. The RAN applies slice policies according to possibly updated identities. UE 110 stores the identities for subsequent usage in the PLMN.

Particular embodiments include session management (SM). Examples are illustrated in FIGS. 19-22.

FIGS. 19-22 are sequence diagrams illustrating use of a session ID for associating a network slice, according to some embodiments. In the illustrated examples, The UE initiates an SM (Session Management) procedure (e.g., a PDU session establishment).

If there is no RRC connection, it is established and the UE provides the identities stored at MM procedures and also the NAS SM message. The RAN applies slice specific policies using the provided identities.

The MMF selects an SMF for the SM message and may assign a PDU session ID (could also be done by the UE). The SMF#1 sends an SM Accept to the UE and also initiates the setup of the NG3 association between the RAN and the UPF (User Plane Function not shown). The NG3 association includes TEID (e.g. ID of the UPF) and Slice ID specific for the PDU session (and SMF#1 and UPF of the TEID).

The RAN uses the NG3 information provided by the SMF to install the TED and slice ID relation and applies slice specific policies. The UE is provided with the SM message and DRB and the DRB mapping rules to PDU flows (not shown). The UE also receives the PDU session ID.

The RAN applies slice specific policies to user data sent towards a specific slice (i.e., towards an NG3 tunnel). In a subsequent SM message directed to the PDU session, the UE includes an ID (e.g., the PDU session ID) in the RRC message, which enables the RAN to identify that the message is directed to a specific slice and apply slice specific policies to the message.

Figure 23:
FIG. 23 is a flow diagram of an example method in a core network node, according to some embodiments.
Figure 24:
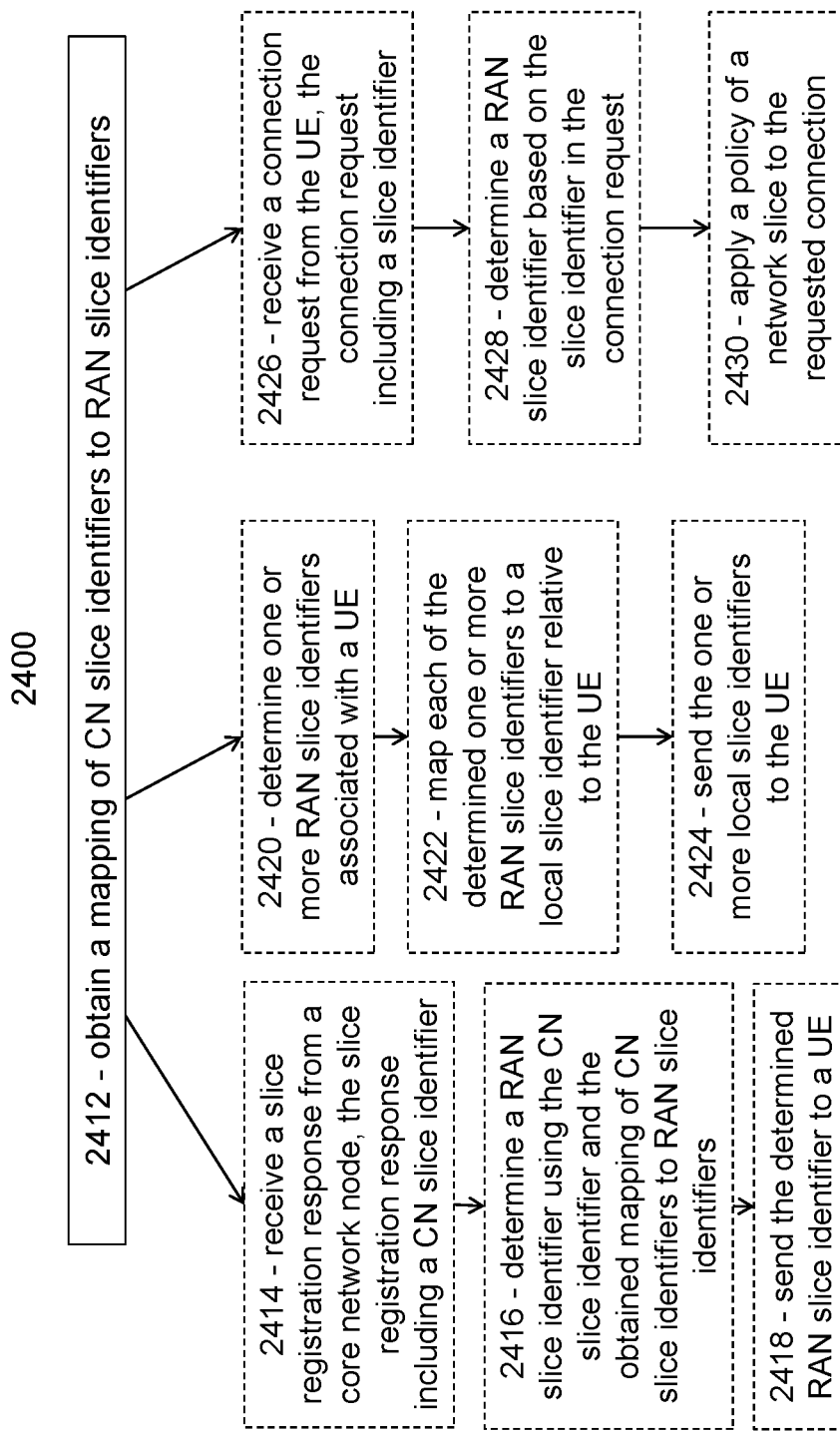
FIG. 24 is a flow diagram of an example method in a network node, according to some embodiments.
Figure 25:
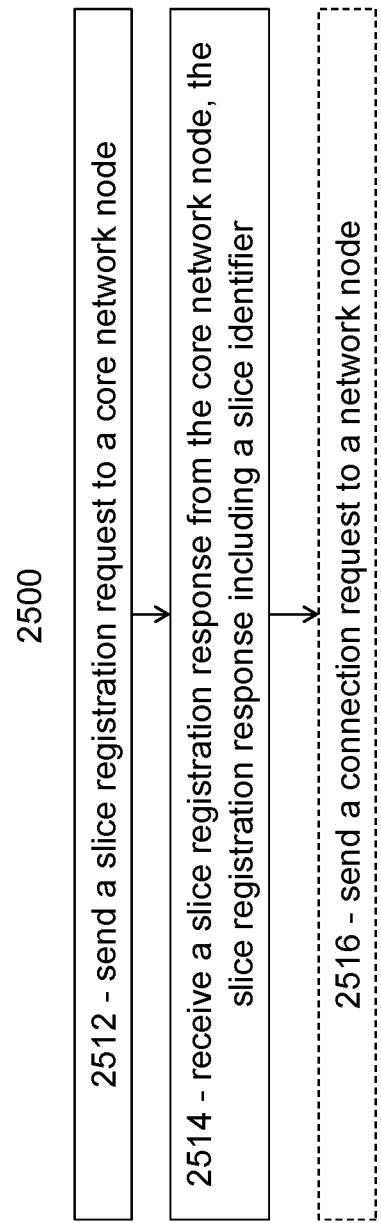
FIG. 25 is a flow diagram of an example method in a user equipment, according to some embodiments.

Particular embodiments performed in a core network node may be generalized by FIG. 23; particular embodiments performed in a network node may be generalized by FIG. 24; and particular embodiments performed in a wireless device may be generalized by FIG. 25.

FIG. 23 is a flow diagram illustrating an example method in a core network node, according to some embodiments. In particular embodiments, one or more steps of FIG. 23 may be performed by core network node 320 of wireless network 100 described with respect to FIG. 11.

The method begins at step 2312, where a core network node obtains a mapping of CN slice identifiers to RAN slice identifiers. For example, core network node 320 may obtain a mapping of CN slice identifiers to RAN slice identifiers.

In particular embodiments, core network node 320 obtains the mapping of CN slice identifiers to RAN slice identifiers by receiving the mapping via provisioning from OSS 320.

In another embodiment, core network node 320 obtains the mapping of CN slice identifiers to RAN slice identifiers by receiving a setup request (e.g., S1 Setup Request) from network node 120. Core network node 320 sends a setup response (e.g., S1 Setup Response) that includes a CN slice identifier back to network node 120. Core network node 320 may then receive a configuration update (e.g., S1AP) from network node 120 that includes the mapping of CN slice identifiers to RAN slice identifiers.

In another embodiment, core network node 320 obtains the mapping of CN slice identifiers to RAN slice identifiers by receiving a setup request (e.g., S1 Setup Request) from network node 120, where the setup request includes one or more RAN slice identifiers. Core network node 320 may map the RAN slice identifiers to CN slice identifiers. In particular embodiments, the core network node may obtain the slice ID mapping according to any of the embodiments or examples described above with respect to FIGS. 12-13, or any of the other embodiments or examples described herein.

At step 2314, the core network node receives a slice registration request from a UE. For example, core network node 320 may receive a slice registration request from wireless device 110. In particular embodiments, the slice registration request may include a CN slice identifier. In particular embodiments, the core network node may obtain the slice registration according to any of the embodiments or examples described above with respect to FIGS. 14-22.

At step 2316, the core network node determines a slice identifier associated with the slice registration request. For example, core network node 320 may determine a slice identifier associated with the slice registration request.

If the slice registration request included a CN slice identifier, core network node 320 may determine a RAN slice identifier associated with the CN slice identifier. Otherwise, core network node 320 may first inspect subscriber information associated with wireless device 110 to determine a CN slice identifier associated with the slice registration request. Then core network node 320 may determine a RAN slice identifier associated with the CN slice identifier. In particular embodiments, the core network node may determine the slice identifier according to any of the embodiments or examples described above with respect to FIGS. 14-22.

At step 2318, the core network node sends a slice registration response to the UE. The slice registration response includes the determined slice identifier. For example, core network node 320 may send a slice registration response to wireless device 110. The slice registration response includes the determined slice identifier. The slice identifier may comprise a local slice identifier relative to wireless device 110, or a temporary or dedicated identifier of core network node 320. The slice registration response may include one or more services associated with the slice identifier. In particular embodiments, the core network node may send the slice registration response according to any of the embodiments or examples described above with respect to FIGS. 14-22.

Modifications, additions, or omissions may be made to method 2300 illustrated in FIG. 23. Additionally, one or more steps in method 2300 may be performed in parallel or in any suitable order.

FIG. 24 is a flow diagram illustrating an example method in a network node, according to some embodiments. In particular embodiments, one or more steps of FIG. 24 may be performed by network node 120 of wireless network 100 described with respect to FIG. 11.

The method begins at step 2412, where a network node obtains a mapping of CN slice identifiers to RAN slice identifiers. For example, network node 120 may obtain a mapping of CN slice identifiers to RAN slice identifiers.

In some embodiments, network node 120 receives the mapping via provisioning from OSS 420. In some embodiments, network node 120 sends a setup request (e.g., S1 Setup Request) to core network node 320. The setup request includes one or more RAN slice identifiers. Network node 120 may receive a setup response (e.g., S1 Setup Response) from core network node 320. The setup response includes the mapping of CN slice identifiers to RAN slice identifiers. In particular embodiments, the network node may obtain the slice ID mapping according to any of the embodiments or examples described above with respect to FIGS. 12-13, or any of the other embodiments or examples described herein.

In some embodiments where the network node takes part in the slice registration/response, the method continues to step 2414. At step 2414, the network node receives a slice registration response from a core network node. The slice registration response includes a CN slice identifier. For example, in particular embodiments network node 120 receives a slice registration response from core network node 320. For example, when the slice registration response is an AS message, network node 120 has visibility into the response from core network node 320 to wireless device 110. In particular embodiments, the network node receives the slice registration response according to any of the embodiments or examples described above with respect to FIGS. 14-22.

At step 2416, the network node determines a RAN slice identifier using the CN slice identifier and the obtained mapping of CN slice identifiers to RAN slice identifiers. For example, in this embodiment network node 120 (instead of core network node 320) may perform the mapping of CN slide ID to RAN slice ID. The slice registration response may include a CN slice identifier. Network node 120 may determine a RAN slice identifier using the CN slice identifier and the previously obtained mapping of CN slice identifiers to RAN slice identifiers. In particular embodiments, the network node determines the slice identifier according to any of the embodiments or examples described above with respect to FIGS. 14-22.

At step 2418, the network node sends the determined RAN slice identifier to a UE. For example, network node 120 may send the determined RAN slice identifier to wireless device 110 (e.g., sends an access AS message to wireless device 110). In particular embodiments, the network node sends the slice identifier according to any of the embodiments or examples described above with respect to FIGS. 14-22.

Returning back to step 2412, in embodiments where the network node determines a local slice ID, the method may continue to step 2420. At step 2420, the network node determines one or more RAN slice identifiers associated with a UE. For example, network node 120 may determine one or more RAN slice identifiers associated with a wireless device 110.

At step 2422, the network node maps each of the determined one or more RAN slice identifiers to a local slice identifier relative to the UE For example, network node 120 may map four global slice identifiers to local slice identifiers 1, 2, 3, 4. The local identifiers uniquely identify a network slice to the particular wireless device 110. A particular benefit is that instead of using long global identifiers, network node 120 may convert the long global identifiers to shorter local identifiers, which consume fewer bits in a signaling message. In particular embodiments, the network node maps the local slice identifier according to any of the embodiments or examples described above with respect to FIGS. 14-22.

At step 2424, the network node sends the one or more local slice identifiers to the UE. For example, network node 120 may send the one or more local slice identifiers to wireless device 110. The local identifiers save space when later when used in signaling messages from wireless device 110. In particular embodiments, the network sends the local slice identifier according to any of the embodiments or examples described above with respect to FIGS. 14-22.

Returning back to step 2412, in embodiments where the network node receives a connection request from the UE, the method may continue to step 2426. At step 2426, the network node receives a connection request from the UE. The connection request includes a slice identifier. For example, network node may receive a connection request from wireless device 110 according to any of the embodiments or examples described above with respect to FIGS. 14-22.

At step 2428, the network node determines a RAN slice identifier based on the slice identifier in the connection request. For example, the slice identifier may include at least one of a RAN slice identifier, a CN slice identifier, a temporary core network node identifier, a dedicated core network node identifier, a service identifier, or a slice class identifier. Network node may determine the RAN slice identifier according to any of the embodiments or examples described above with respect to FIGS. 14-22.

At step 2430, the network node applies a policy of a network slice to the requested connection. For example, network node 120 may apply a particular slice policy to the connection for wireless device 110. In particular embodiments, network node 120 may apply to policy according to any of the embodiments or examples described above with respect to FIGS. 14-22.

Modifications, additions, or omissions may be made to method 2400 illustrated in FIG. 24. Additionally, one or more steps in method 2400 may be performed in parallel or in any suitable order.

FIG. 25 is a flow diagram illustrating an example method in a user equipment, according to some embodiments. In particular embodiments, one or more steps of FIG. 25 may be performed by wireless device 110 of wireless network 100 described with respect to FIG. 11.

The method begins at step 2512, where a user equipment sends a slice registration request to a core network node. Wireless device 110 may send a slice registration request to core network node 320 according to any of the embodiments or examples described above with respect to FIGS. 14-22.

At step 2514, the user equipment receives a slice registration response from the core network node. The slice registration response includes a slice identifier. For example, core network node 320 may receive a slice registration request from wireless device 110. In particular embodiments, the slice registration request may include a CN slice identifier. In some embodiments, the slice identifier in the response may include at least one of a RAN slice identifier, a CN slice identifier, a local slice identifier relative to the UE, a temporary core network node identifier, a dedicated core network node identifier, and a service identifier. In particular embodiments, the core network node may obtain the slice registration according to any of the embodiments or examples described above with respect to FIGS. 14-22.

At step 2516, the UE sends a connection request to a network node. For example, wireless device 110 may send a connection request to network node 120. The connection request includes at least one of a RAN slice identifier, a CN slice identifier, a local slice identifier relative to the UE, a temporary core network node identifier, a dedicated core network node identifier, and a service identifier. In some embodiments, wireless device 110 sends a connection request that includes a network slice class identifier. In particular embodiments, the UE may send a connection request according to any of the embodiments or examples described above with respect to FIGS. 14-22.

Modifications, additions, or omissions may be made to method 2500 illustrated in FIG. 25. Additionally, one or more steps in method 2300 may be performed in parallel or in any suitable order.

Figure 26B:
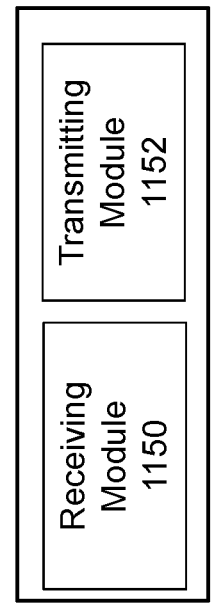
FIG. 26B is a block diagram illustrating example components of a wireless device.
Figure 26A:
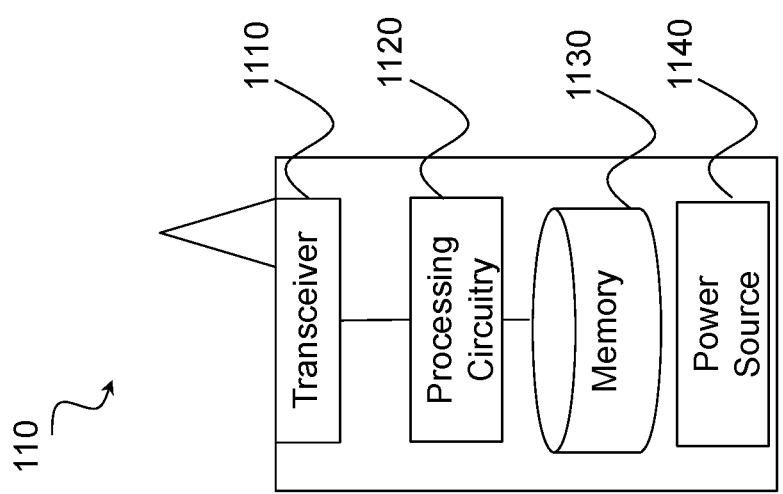
FIG. 26A is a block diagram illustrating an example embodiment of a wireless device.

FIG. 26A is a block diagram illustrating an example embodiment of a wireless device. The wireless device is an example of the wireless devices 110 illustrated in FIG. 11. In particular embodiments, the wireless device is capable of associating a wireless connection with a network slice. The wireless device is operable to send a slice registration request to a core network node, and receive a slice registration response from the core network node.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1110, processing circuitry 1120, memory 1130, and power source 1140. In some embodiments, transceiver 1110 facilitates transmitting wireless signals to and receiving wireless signals from wireless network node 120 (e.g., via an antenna), processing circuitry 1120 executes instructions to provide some or all of the functionality described herein as provided by the wireless device, and memory 1130 stores the instructions executed by processing circuitry 1120. Power source 1140 supplies electrical power to one or more of the components of wireless device 110, such as transceiver 1110, processing circuitry 1120, and/or memory 1130.

Processing circuitry 1120 includes any suitable combination of hardware and software implemented in one or more integrated circuits or modules to execute instructions and manipulate data to perform some or all of the described functions of the wireless device. In some embodiments, processing circuitry 1120 may include, for example, one or more computers, one more programmable logic devices, one or more central processing units (CPUs), one or more microprocessors, one or more applications, and/or other logic, and/or any suitable combination of the preceding. Processing circuitry 1120 may include analog and/or digital circuitry configured to perform some or all of the described functions of wireless device 110. For example, processing circuitry 1120 may include resistors, capacitors, inductors, transistors, diodes, and/or any other suitable circuit components.

Memory 1130 is generally operable to store computer executable code and data. Examples of memory 1130 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1140 is generally operable to supply electrical power to the components of wireless device 110. Power source 1140 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 26A) responsible for providing certain aspects of the wireless device's functionality, including any of the functionality described above and/or any additional functionality (including any functionality necessary to support the solution described above).

FIG. 26B is a block diagram illustrating example components of wireless device 110. The components may include receiving module 1150 and transmitting module 1152.

Receiving module 1150 may perform the receiving functions of wireless device 110. For example, receiving module 1150 may receive, from a core network node, a setup response as described in any of the embodiments or examples above. In certain embodiments, receiving module 1150 may include or be included in processing circuitry 1120. In particular embodiments, receiving module 1150 may communicate with and transmitting module 1152.

Transmitting module 1152 may perform the transmitting functions of wireless device 110. For example, transmitting module 1152 may send a slice registration request to a core network node according to any of the examples described above. In certain embodiments, transmitting module 1152 may include or be included in processing circuitry 1120. In particular embodiments, transmitting module 1152 may communicate with receiving module 1150 and determining module 1152.

FIG. 27A is a block diagram illustrating an example embodiment of a network node. The network node is an example of the network node 120 illustrated in FIG. 11. In particular embodiments, the network node is capable of obtaining a mapping of CN slice identifiers to RAN slice identifiers. In some embodiments, the network node is capable of receiving a slice registration response from a core network node; determining a RAN slice identifier using the CN slice identifier and the obtained mapping of CN slice identifiers to RAN slice identifiers; and sending the determined RAN slice identifier to a wireless device. In some embodiments, the network node is capable of determining one or more RAN slice identifiers associated with a wireless device; mapping each of the determined one or more RAN slice identifiers to a local slice identifier relative to the wireless device; and sending the one or more local slice identifiers to the wireless device. In some embodiments, the network node is capable of receiving a connection request from the UE; determining a RAN slice identifier based on the slice identifier; and applying a policy of a network slice to the requested connection.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1210, at least one processing circuitry 1220, at least one memory 1230, and at least one network interface 1240. Transceiver 1210 facilitates transmitting wireless signals to and receiving wireless signals from a wireless device, such as wireless devices 110 (e.g., via an antenna); processing circuitry 1220 executes instructions to provide some or all of the functionality described above as being provided by a network node 120; memory 1230 stores the instructions executed by processing circuitry 1220; and network interface 1240 communicates signals to backend network components, such as a gateway, switch, router, Internet, Public Switched Telephone Network (PSTN), controller, and/or other network nodes 120. Processing circuitry 1220 and memory 1230 can be of the same types as described with respect to processing circuitry 1120 and memory 1130 of FIG. 26A above.

In some embodiments, network interface 1240 is communicatively coupled to processing circuitry 1220 and refers to any suitable device operable to receive input for network node 120, send output from network node 120, perform suitable processing of the input or output or both, communicate to other devices, or any combination of the preceding. Network interface 1240 includes appropriate hardware (e.g., port, modem, network interface card, etc.) and software, including protocol conversion and data processing capabilities, to communicate through a network.

Other embodiments of network node 120 include additional components (beyond those shown in FIG. 27A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 27B is a block diagram illustrating example components of network node 120. The components may include receiving module 1250, determining module 1252, transmitting module 1254, and applying module 1256.

Receiving module 1250 may perform the receiving functions of network node 120. For example, receiving module 1250 may receive a slice registration response from a core network node, or receive a connection request from a wireless device, as described in any of the embodiments or examples above. In certain embodiments, receiving module 1250 may include or be included in processing circuitry 1220. In particular embodiments, receiving module 1250 may communicate with determining module 1252, transmitting module 1254, and applying module 1256.

Determining module 1252 may perform the determining functions of network node 120. For example, determining module 1252 may determine a RAN slice identifier using a CN slice identifier and an obtained mapping of CN slice identifiers to RAN slice identifiers, determine one or more RAN slice identifiers associated with a UE, and/or determine a RAN slice identifier based on a slice identifier in a connection request, according to any of the examples described above. In certain embodiments, determining module 1252 may include or be included in processing circuitry 1220. In particular embodiments, determining module 1252 may communicate with receiving module 1250, transmitting module 1254, and applying module 1256.

Transmitting module 1254 may perform the transmitting functions of network node 120. For example, transmitting module 1254 may send a determined RAN slice identifier to a UE and/or send local slice identifiers to a wireless device, according to any of the examples described above. In certain embodiments, transmitting module 1254 may include or be included in processing circuitry 1220. In particular embodiments, transmitting module 1254 may communicate with receiving module 1250, determining module 1252, and applying module 1256.

Applying module 1256 may perform the applying functions of network node 120. For example, applying module 1256 may apply a policy of a network slice to a wireless connection, according to any of the examples described above. In certain embodiments, applying module 1256 may include or be included in processing circuitry 1220. In particular embodiments, applying module 1256 may communicate with receiving module 1250, determining module 1252, and transmitting module 1254.

Figures 28A, 28B:
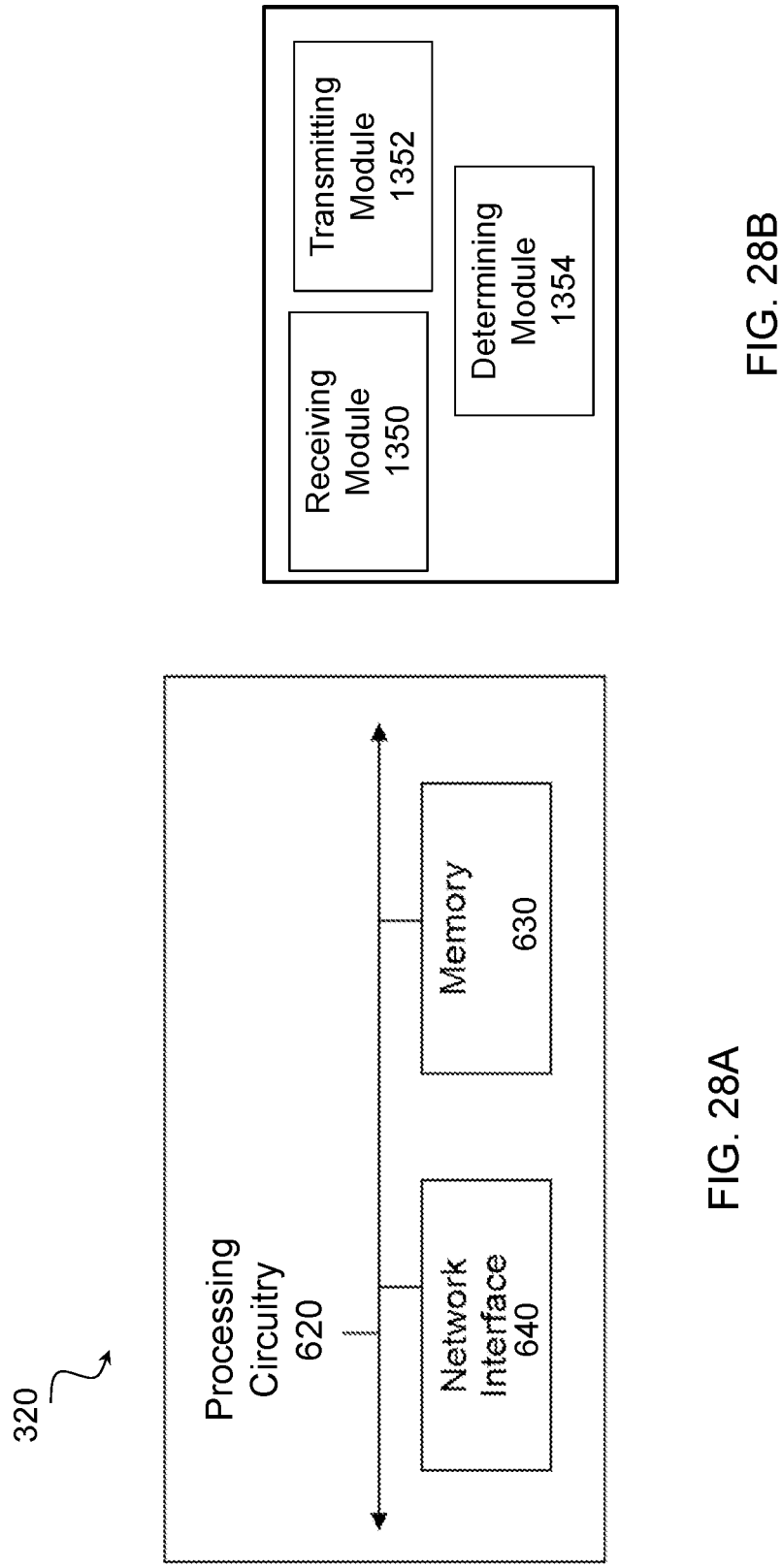
FIG. 28A is a block diagram illustrating an example embodiment of a core network node.
FIG. 28B is a block diagram illustrating example components of a core network node.

FIG. 28A is a block schematic of an example core network node 320, in accordance with certain embodiments. In particular embodiments, the core network node is capable of obtaining a mapping of CN slice identifiers to RAN slice identifiers; receiving a slice registration request from a wireless device; determining a slice identifier associated with the slice registration request; and sending a slice registration response to the wireless device.

Examples of core network nodes can include a mobile switching center (MSC), a serving GPRS support node (SGSN), a mobility management entity (MME), a radio network controller (RNC), a base station controller (BSC), an access and mobility management function (AMF), and so on. The core network node includes processing circuitry 620, memory 630, and network interface 640. In some embodiments, processing circuitry 620 executes instructions to provide some or all of the functionality described above as being provided by the network node, memory 630 stores the instructions executed by processing circuitry 620, and network interface 640 communicates signals to any suitable node, such as a gateway, switch, router, Internet, Public Switched Telephone Network (PSTN), network nodes 120, radio network controllers or core network nodes 320, etc.

Processing circuitry 620 may include any suitable combination of hardware and software implemented in one or more modules to execute instructions and manipulate data to perform some or all of the described functions of the core network node. In some embodiments, processing circuitry 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processing circuitry 620 and may refer to any suitable device operable to receive input for the network node, send output from the network node, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of the network node may include additional components beyond those shown in FIG. 28A that may be responsible for providing certain aspects of the core network node's functionality, including any of the functionality described above and/or any additional functionality (including any functionality necessary to support the solution described above).

FIG. 28B is a block diagram illustrating example components of core network node 320. The components may include receiving module 1350, transmitting module 1352, and determining module 1354.

Receiving module 1350 may perform the receiving functions of core network node 320. For example, receiving module 1350 may obtaining a mapping of CN slice identifiers to RAN slice identifiers, and/or receive a slice registration request from a wireless device, as described in any of the embodiments or examples above. In certain embodiments, receiving module 1350 may include or be included in processing circuitry 620. In particular embodiments, receiving module 1350 may communicate with transmitting module 1352 and determining module 1354.

Transmitting module 1352 may perform the transmitting functions of core network node 320. For example, transmitting module 1352 may send a slice registration response to a wireless device according to any of the examples described above. In certain embodiments, transmitting module 1352 may include or be included in processing circuitry 620. In particular embodiments, transmitting module 1352 may communicate with receiving module 1350 and determining module 1354.

Determining module 1354 may perform the determining functions of core network node 320. For example, determining module 1354 may determine a slice identifier associated with a slice registration request according to any of the examples described above. In certain embodiments, determining module 1354 may include or be included in processing circuitry 620. In particular embodiments, determining module 1354 may communicate with receiving module 1350 and transmitting module 1352.

Some embodiments of the disclosure may provide one or more technical advantages. Some embodiments may benefit from some, none, or all of these advantages. Other technical advantages may be readily ascertained by one of ordinary skill in the art. For example, some embodiments may enable the RAN to be network slice-aware, which enables a UE to indicate slice specific RAN configuration during connection setup. Particular embodiments minimize extra signaling bits exchanged over the radio interface, while providing the advantages above.

Although this disclosure has been described in terms of certain embodiments, alterations and permutations of the embodiments will be apparent to those skilled in the art. Although some embodiments have been described with reference to certain radio access technologies, any suitable radio access technology (RAT) or combination of radio access technologies may be used, such as long term evolution (LTE), LTE-Advanced, NR, UMTS, HSPA, GSM, cdma2000, WiMax, WiFi, etc. Accordingly, the above description of the embodiments does not constrain this disclosure. Other changes, substitutions, and alterations are possible without departing from the spirit and scope of this disclosure.

Abbreviations:
3GPP 3rd Generation Partnership Project
ACB Access Class Barring
AS Access Stratum
CA Carrier Aggregation
CC Component Carrier
CN Core Network
eNB Evolved Node B
eNodeB Evolved Node B
FDD Frequency Division Duplex
ID Identifier
IoT Internet of Things
LTE Long-Term Evolution
NAS Non Access Stratum
NR New Radio
NW Network
PCC Primary Component Carrier
PCell Primary Cell
PDU Protocol Data Unit
RAT Radio Access Technology
RAN Radio Access Network
RRC Radio Resource Control
RSRP Reference Signal Received Power
RSRQ Reference Signal Received Quality
SCC Secondary Component Carrier
SCell Secondary Cell
SLA Service Level Agreement
SRB Signaling Radio Bearer
TDD Time Division Duplex
UE User Equipment
UMTS Universal Mobile Telecommunications System

The invention claimed is:

1. A method for use in a core network node of associating network slice identifiers, the method comprising:
obtaining a mapping of core network (CN) slice identifiers to radio access network (RAN) slice identifiers;
receiving a slice registration request from a user equipment (UE);
determining a RAN slice identifier associated with the slice registration request based at least in part on the mapping of CN slice identifiers to RAN slice identifiers;
mapping the determined RAN slice identifier to a local slice identifier relative to the UE; and
sending a slice registration response to the UE, the slice registration response including the determined local slice identifier.

2. The method of claim 1, wherein obtaining the mapping of CN slice identifiers to RAN slice identifiers comprises receiving the mapping via provisioning from an operation and support system.

3. The method of claim 1, wherein obtaining the mapping of CN slice identifiers to RAN slice identifiers comprises:
receiving a setup request from a network node;
sending a setup response to the network node, the setup response comprising a CN slice identifier; and
receiving a configuration update from the network node, the configuration update comprising the mapping of CN slice identifiers to RAN slice identifiers.

4. The method of claim 1, wherein obtaining the mapping of CN slice identifiers to RAN slice identifiers comprises:
receiving a setup request from a network node, the setup request comprising one or more RAN slice identifiers; and
mapping the one or more RAN slice identifiers to CN slice identifiers.

5. The method of claim 1, wherein:
the slice registration request includes a CN slice identifier; and
determining a RAN slice identifier associated with the slice registration request comprises determining the RAN slice identifier associated with the CN slice identifier included in the slice registration request.

6. The method of claim 1, wherein determining a RAN slice identifier associated with the slice registration request comprises:
inspecting UE subscriber information to determine a CN slice identifier associated with the slice registration request; and
determining the RAN slice identifier associated with the CN slice identifier associated with the slice registration request.

7. The method of claim 1, wherein the RAN slice identifier comprises one or more of:
a local slice identifier relative to the UE; or
a temporary or dedicated core network node identifier.

8. The method of claim 1, wherein the slice registration response comprises one or more of:
one or more services associated with the RAN slice identifier;
a non access stratum (NAS) message; or
an access stratum (AS) message.

9. A core network node capable of associating network slice identifiers, the core network node comprising processing circuitry operable to:
obtain a mapping of core network (CN) slice identifiers to radio access network (RAN) slice identifiers;
receive a slice registration request from a user equipment (UE);

determine a RAN slice identifier associated with the slice registration request based at least in part on the mapping of CN slice identifiers to RAN slice identifiers;

map the determined RAN slice identifier to a local slice identifier relative to the UE; and send a slice registration response to the UE, the slice registration response including the determined local slice identifier.

10. The core network node of claim 9, wherein the processing circuitry operable to obtain the mapping of CN slice identifiers to RAN slice identifiers is operable to receive the mapping via provisioning from an operation and support system.

11. The core network node of claim 9, wherein the processing circuitry operable to obtain the mapping of CN slice identifiers to RAN slice identifiers is operable to:

receive a setup request from a network node;

send a setup response to the network node, the setup response comprising a CN slice identifier; and receive a configuration update from the network node, the configuration update comprising the mapping of CN slice identifiers to RAN slice identifiers.

12. The core network node of claim 9, wherein the processing circuitry operable to obtain the mapping of CN slice identifiers to RAN slice identifiers is operable to:

receive a setup request from a network node, the setup request comprising one or more RAN slice identifiers; and map the one or more RAN slice identifiers to CN slice identifiers.

13. The core network node of claim 9, wherein:

the slice registration request includes a CN slice identifier; and the processing circuitry operable to determine the RAN slice identifier associated with the slice registration request is operable to determine the RAN slice identifier associated with the CN slice identifier included in the slice registration request.

14. The core network node of claim 9, wherein the processing circuitry operable to determine the RAN slice identifier associated with the slice registration request is operable to:

inspect UE subscriber information to determine a CN slice identifier associated with the slice registration request; and determine the RAN slice identifier associated with the CN slice identifier associated with the slice registration request.

15. The core network node of claim 9, wherein the RAN slice identifier comprises one or more of:

a local slice identifier relative to the UE; or one of a temporary or dedicated core network node identifier.

16. The core network node of claim 9, wherein the slice registration response comprises one or more of:

one or more services associated with the RAN slice identifier;

a non access stratum (NAS) message; or an access stratum message.

17. A method for use in a network node of associating network slice identifiers, the method comprising:

obtaining a mapping of core network (CN) slice identifiers to radio access network (RAN) slice identifiers sending a setup request to a core network node, the setup request including one or more RAN slice identifiers;

receiving a setup response from the core network node, the setup response including the mapping of CN slice identifiers to RAN slice identifiers receiving a slice registration response from a core network node, the slice registration response including a CN slice identifier;

determining a RAN slice identifier using the CN slice identifier and the obtained mapping of CN slice identifiers to RAN slice identifiers;

mapping the determined RAN slice identifier to a local slice identifier relative to the UE; and sending the determined local slice identifier to a user equipment (UE).

18. A network node capable of associating network slice identifiers, the network node comprising processing circuitry operable to:

obtain a mapping of core network (CN) slice identifiers to radio access network (RAN) slice identifiers;

send a setup request to a core network node, the setup request including one or more RAN slice identifiers;

receive a setup response from the core network node, the setup response including the mapping of CN slice identifiers to RAN slice identifiers;

receive a slice registration response from a core network node, the slice registration response including a CN slice identifier;

determine a RAN slice identifier using the CN slice identifier and the obtained mapping of CN slice identifiers to RAN slice identifiers;

map the determined RAN slice identifier to a local slice identifier relative to the UE; and send the determined local slice identifier to a user equipment (UE).

* * * * *